United States Patent
Pagani et al.

(10) Patent No.: US 9,939,338 B2
(45) Date of Patent: Apr. 10, 2018

(54) PRESSURE SENSING DEVICE WITH CAVITY AND RELATED METHODS

(71) Applicant: STMICROELECTRONICS S.r.l., Agrate Brianza (IT)

(72) Inventors: Alberto Pagani, Nova Milanese (IT); Federico Giovanni Ziglioli, Pozzo d'Adda (IT); Bruno Murari, Monza (IT)

(73) Assignee: STMicroelectronics S.R.L., Agrate Brianza (MB) (IT)

( * ) Notice: Subject to any disclaimer, the term of this patent is extended or adjusted under 35 U.S.C. 154(b) by 176 days.

(21) Appl. No.: 14/626,153

(22) Filed: Feb. 19, 2015

(65) Prior Publication Data
US 2016/0245709 A1    Aug. 25, 2016

(51) Int. Cl.
| G01L 1/20 | (2006.01) |
| G01L 5/00 | (2006.01) |
| G01L 1/18 | (2006.01) |
| F16B 31/02 | (2006.01) |

(52) U.S. Cl.
CPC .......... *G01L 5/0038* (2013.01); *F16B 31/028* (2013.01); *G01L 1/18* (2013.01); *G01L 1/20* (2013.01)

(58) Field of Classification Search
CPC ... F16B 31/02; G01L 1/18; G01L 1/20; G01L 5/0038
USPC ................................................. 73/761; 4/761
See application file for complete search history.

(56) References Cited

U.S. PATENT DOCUMENTS

| 7,622,782 B2 * | 11/2009 | Chu | B81C 3/001 257/415 |
| 2004/0153270 A1 * | 8/2004 | Yamashita | G01N 33/383 702/81 |
| 2005/0284231 A1 * | 12/2005 | Zimmerman | G01L 5/24 73/761 |
| 2008/0016683 A1 * | 1/2008 | Brida | G01L 19/146 29/739 |
| 2008/0315333 A1 * | 12/2008 | Combi | B81B 7/0061 257/415 |
| 2009/0033467 A1 | 2/2009 | Finocchiaro et al. | |
| 2009/0235753 A1 * | 9/2009 | Yamamoto | G01L 9/0054 73/727 |

(Continued)

FOREIGN PATENT DOCUMENTS

WO    WO 2012084295 A1 *    6/2012    .......... G01M 5/0083

OTHER PUBLICATIONS

"Materials Selection and Design," ASM Handbook vol. 20, Dec. 1, 1997, 1 page.

(Continued)

*Primary Examiner* — Natalie Huls
*Assistant Examiner* — Monica S Young
(74) *Attorney, Agent, or Firm* — Slater Matsil, LLP

(57) ABSTRACT

A pressure sensing device may include a body configured to distribute a load applied between first and second parts positioned one against the other, and a pressure sensor carried by the body. The pressure sensor may include a support body, and an IC die mounted with the support body and defining a cavity. The IC die may include pressure sensing circuitry responsive to bending associated with the cavity, and an IC interface coupled to the pressure sensing circuitry.

24 Claims, 27 Drawing Sheets

(56) References Cited

U.S. PATENT DOCUMENTS

2013/0050228 A1* 2/2013 Petersen ............... H01L 23/053
 345/501
2013/0342186 A1* 12/2013 Pagani ................ G01M 5/0083
 324/71.1

OTHER PUBLICATIONS

Kuo et al., "Smart-Cut Piezoresistive Strain Sensors for High Temperature Applications," IEEE Sensors 2009 Conference, pp. 1290-1292.
Barlian et al., "Review: Semiconductor Piezoresistance for Microsystems," IEEE, vol. 97, No. 3, Mar. 2009, pp. 513-552.

* cited by examiner

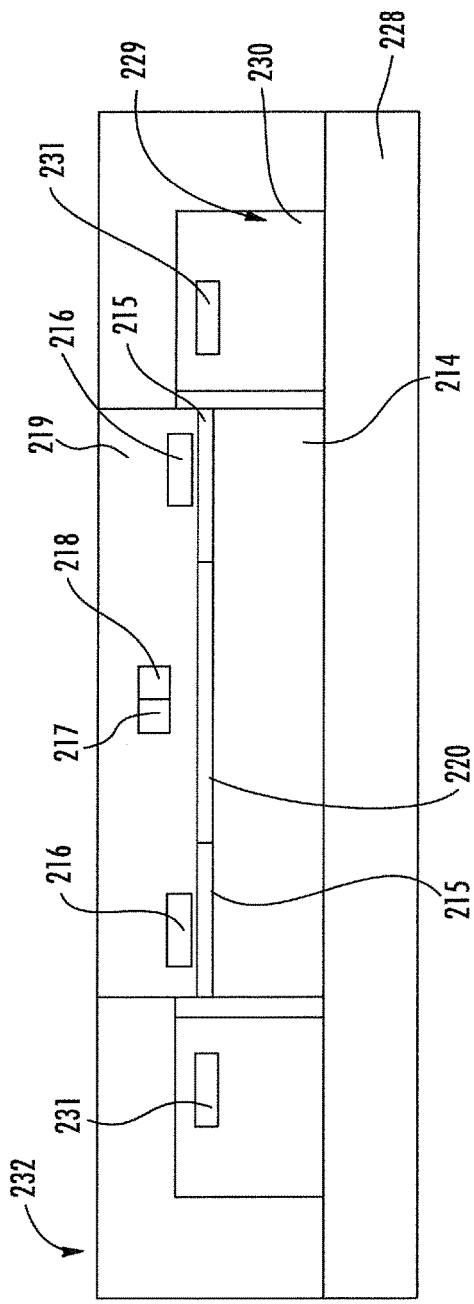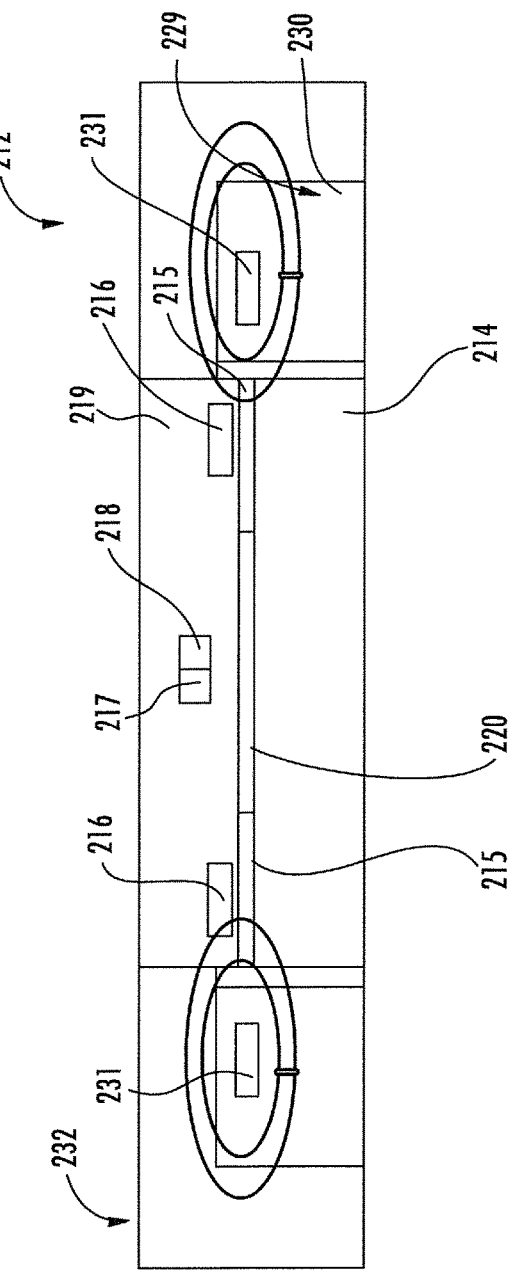
FIG. 4C
FIG. 4D

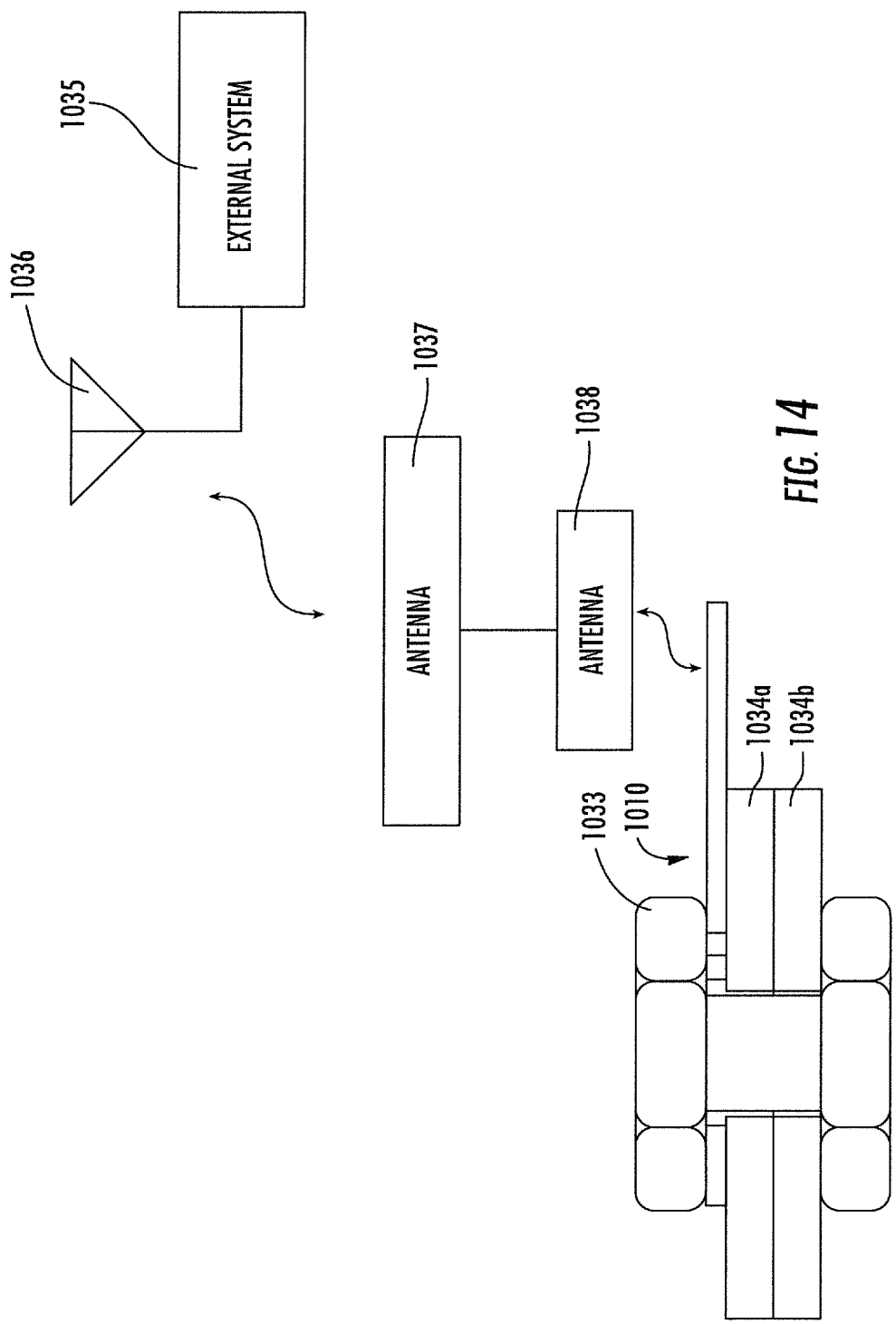

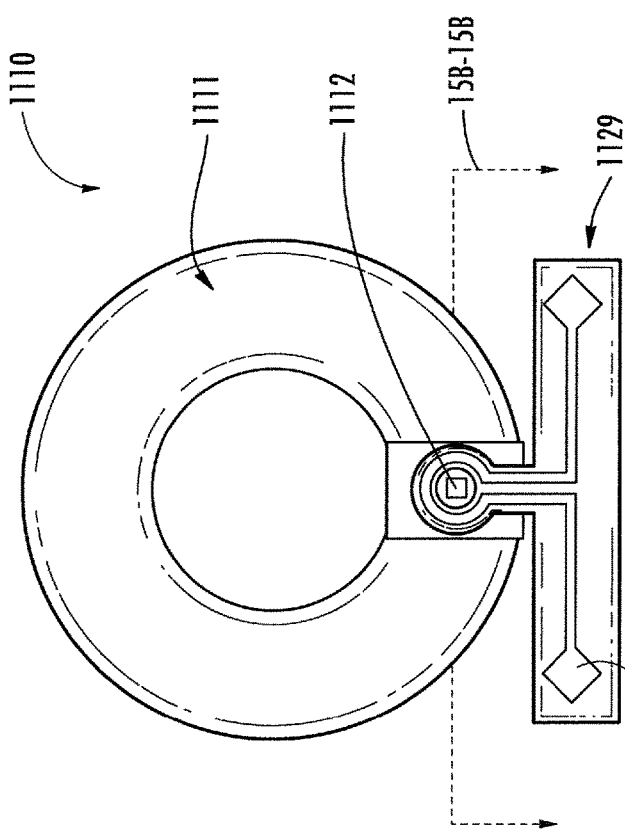
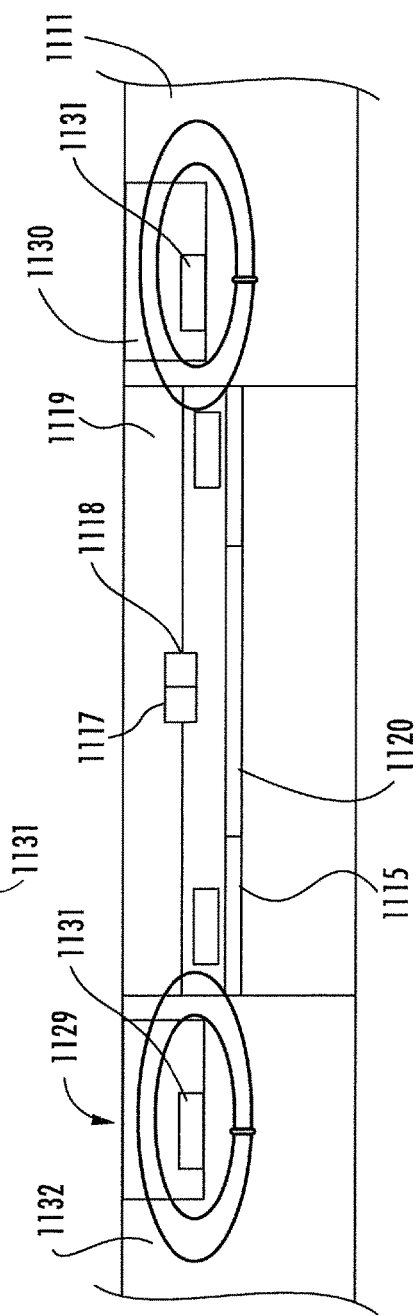
FIG. 15A
FIG. 15B

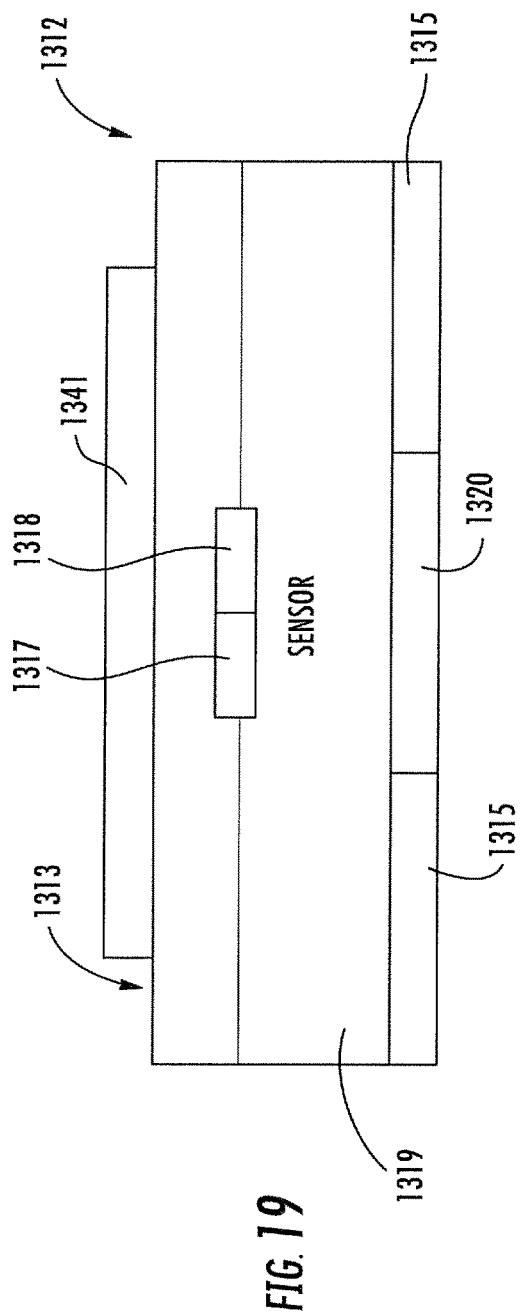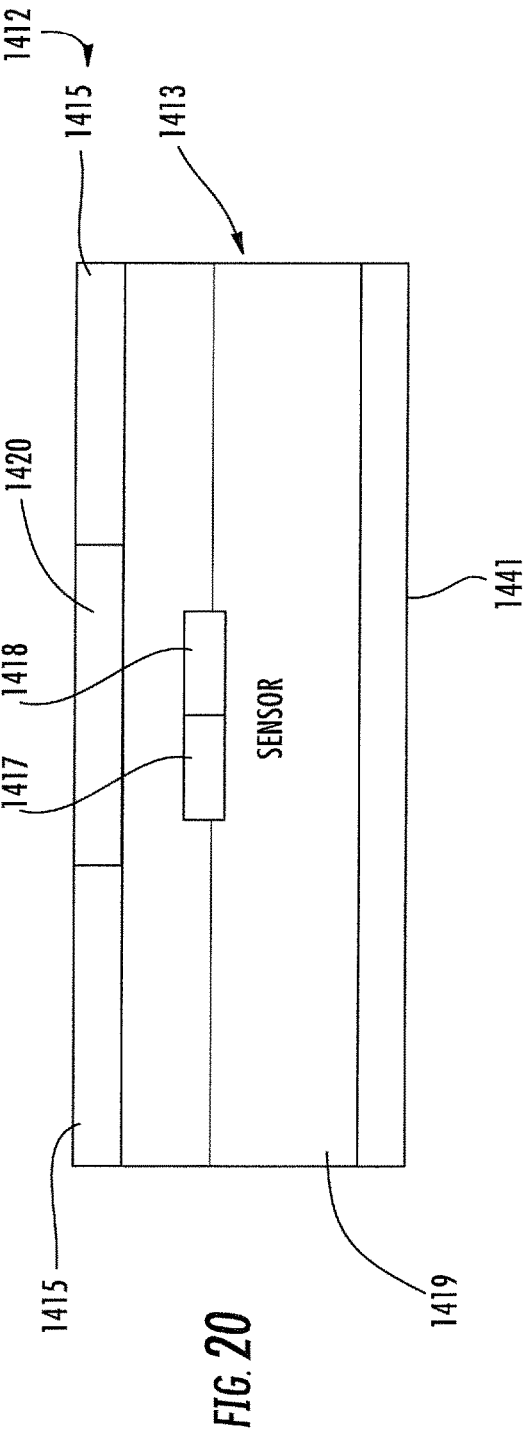

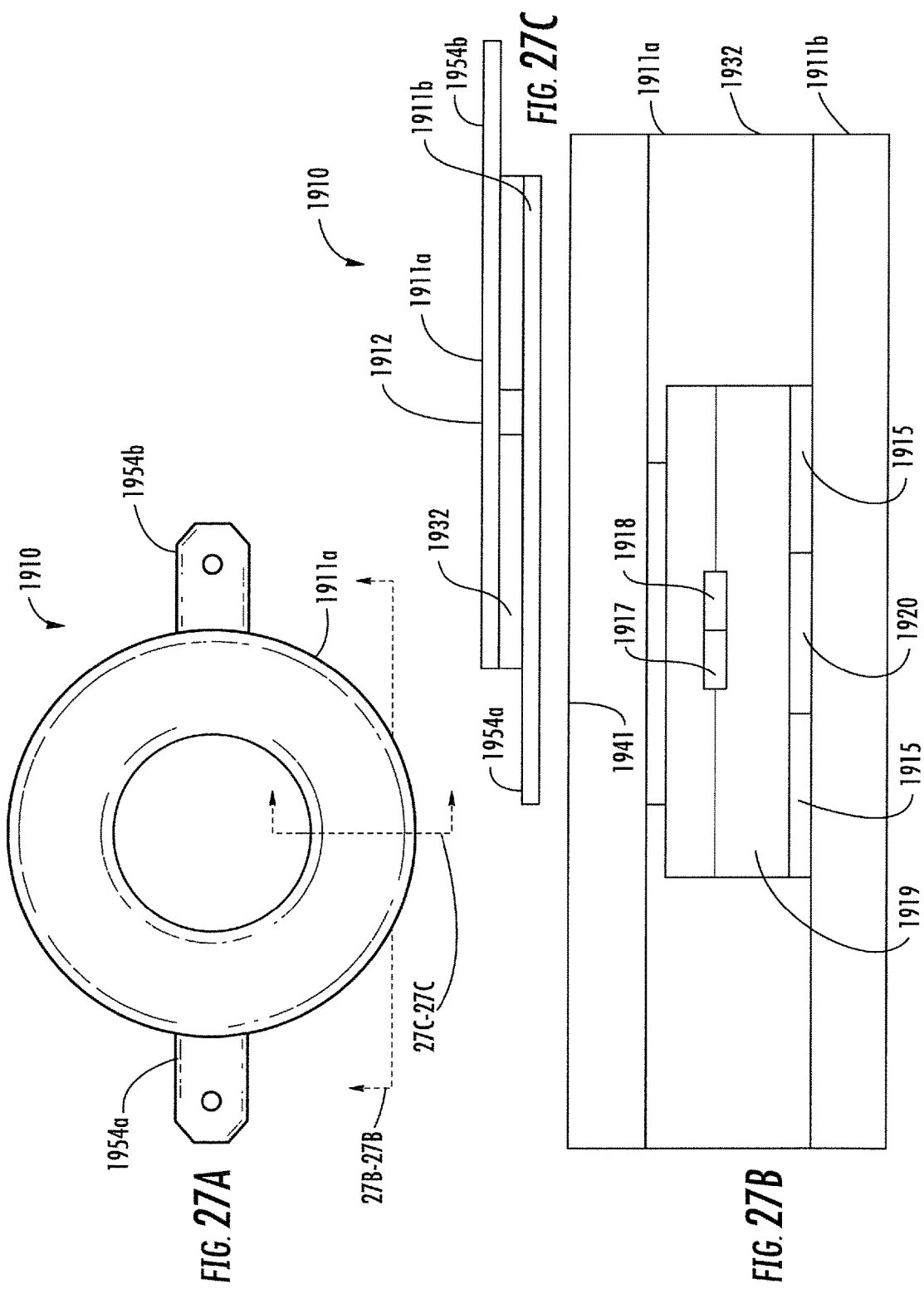

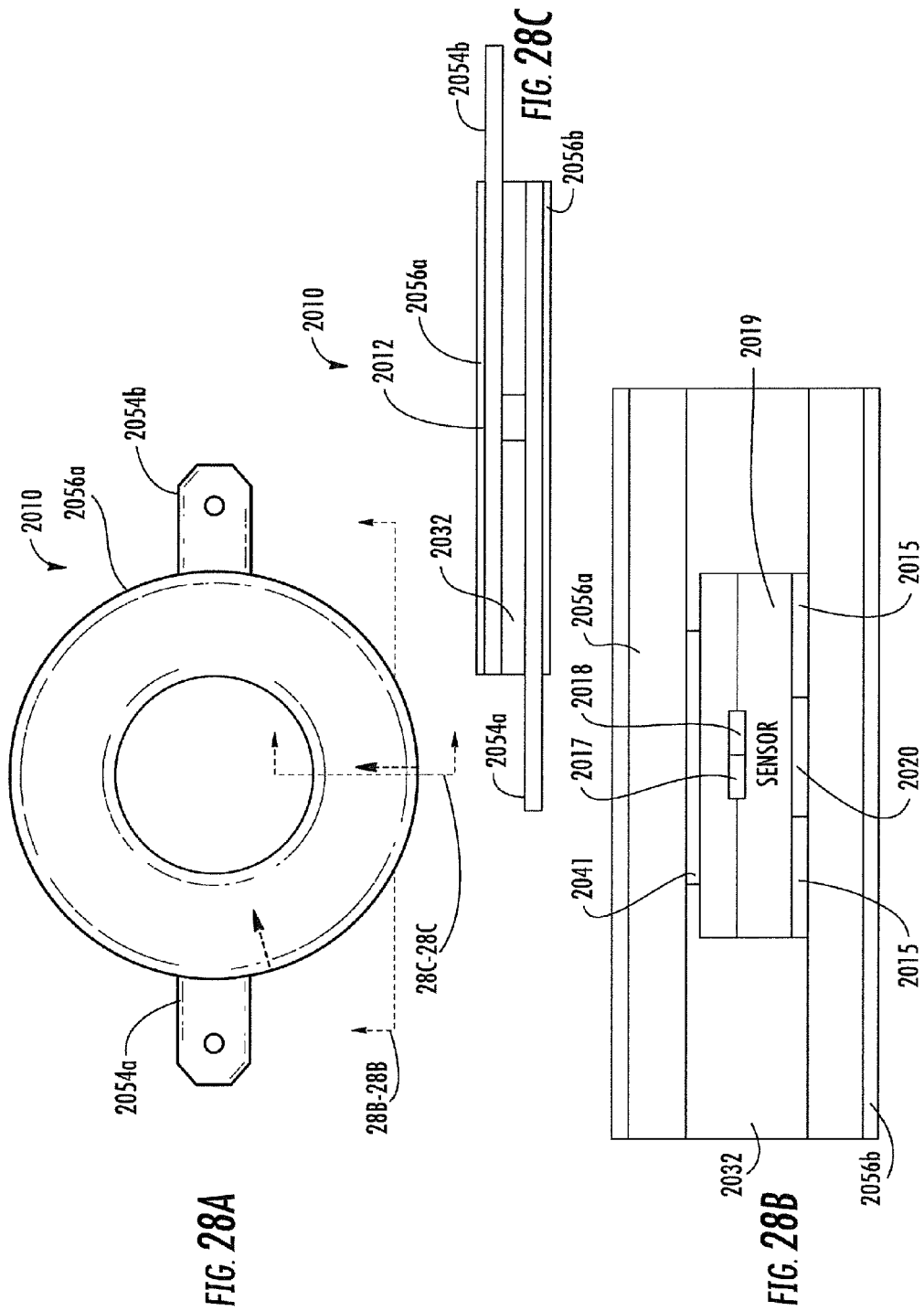

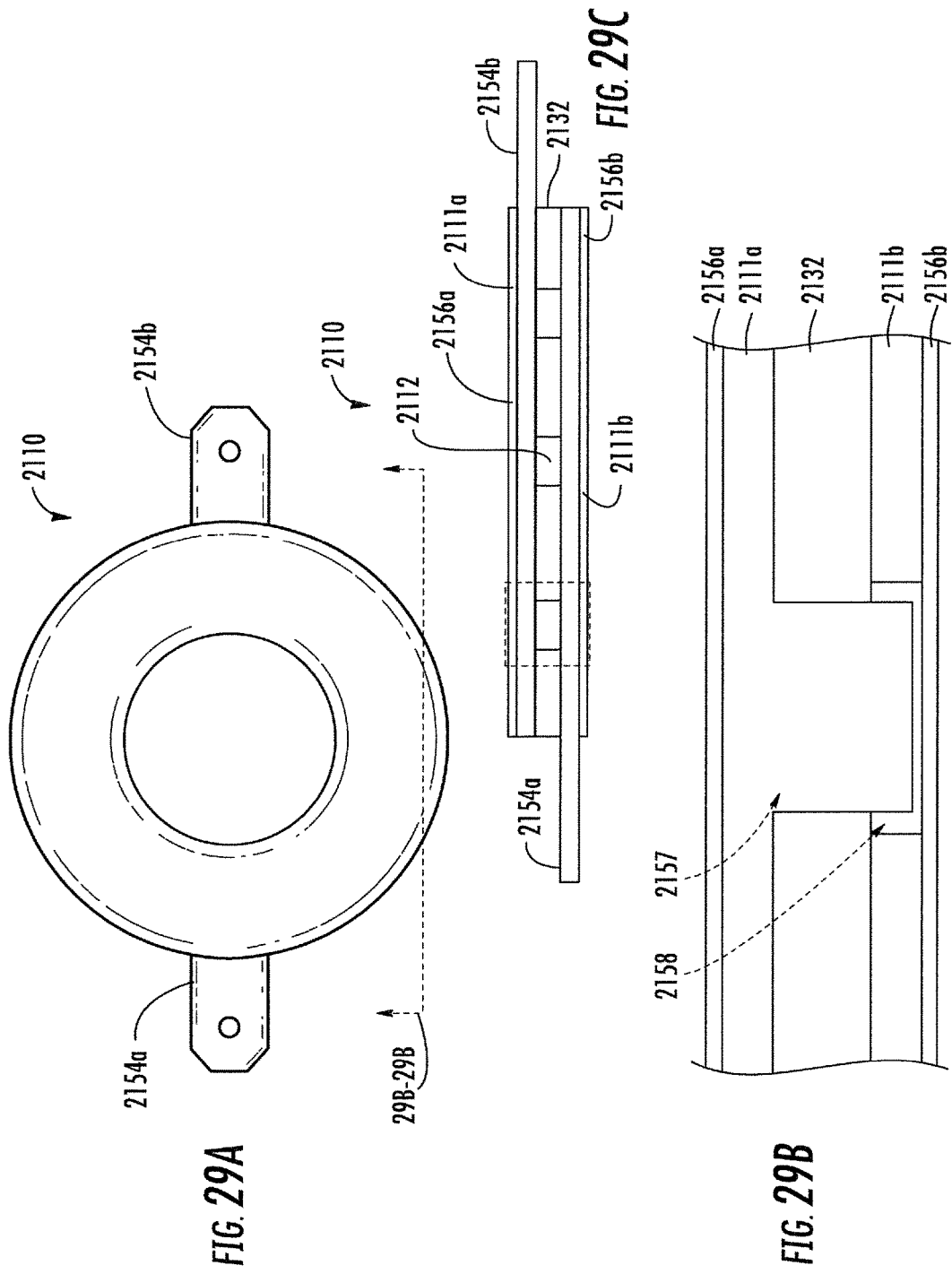

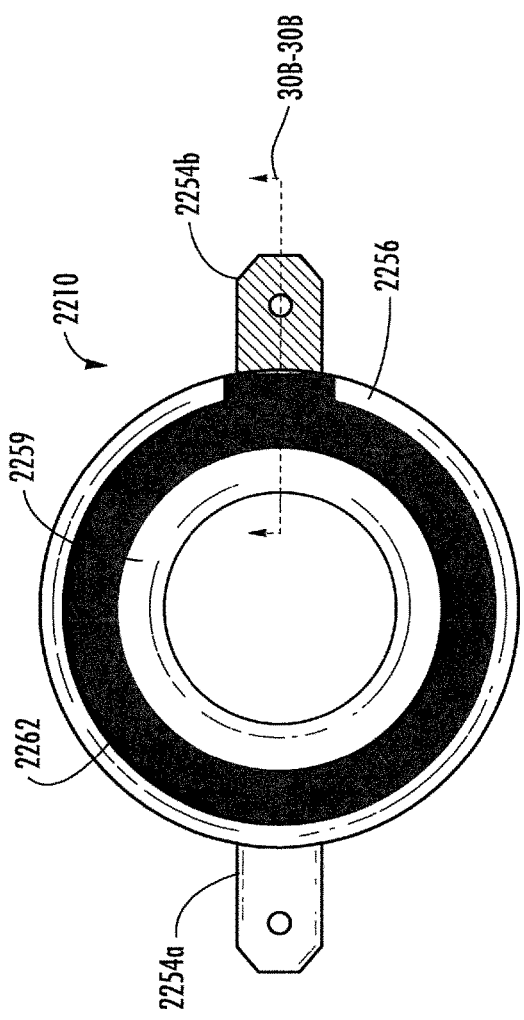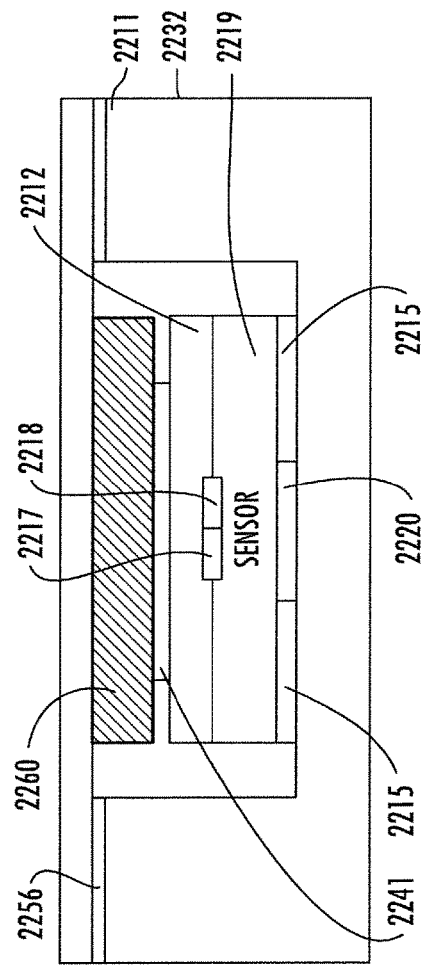
FIG. 30A
FIG. 30B

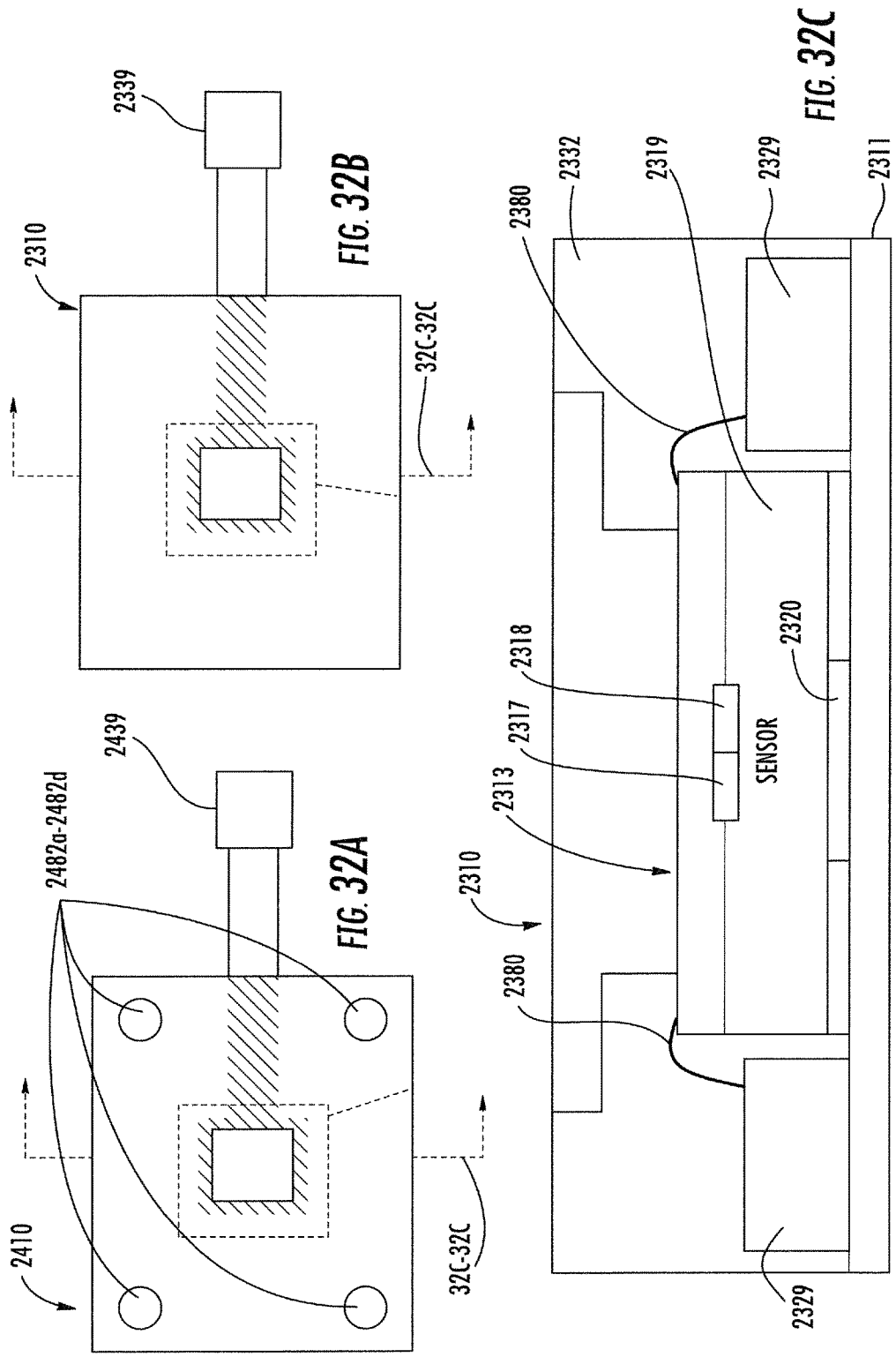

PRESSURE SENSING DEVICE WITH CAVITY AND RELATED METHODS

TECHNICAL FIELD

The present disclosure relates to the field of electronic devices, and, more particularly, to integrated circuits and related methods.

BACKGROUND

In solid structures, particularly in load-bearing structures of, for example, bridges, buildings, tunnels, railways, containment walls, dams, embankments, pipelines and underground structures of metropolitan transport lines, and so on, it may be important to monitor, in many points, significant parameters, like, for example, pressure, temperature and mechanical stresses. Such monitoring is carried out periodically or continuously, and is useful both at the initial stage and during the lifetime of the structure.

For this purpose, an approach in this field includes the application of electronic monitoring devices based on electronic sensors, capable of providing good performance at low cost. Usually, such devices are applied onto the surface of the structures to be monitored, or inside recesses already in the structure and accessible from the outside.

Such devices are not able to exhaustively detect the parameters within the structure to be monitored, which it may be useful to know to evaluate the quality of the structure, its safety, its ageing, its reaction to variable atmospheric conditions, and so on. Moreover, such devices can only typically be applied after the structure has been built, and not while it is being built. Therefore, they may be unable to evaluate possible initial or internal defects.

SUMMARY

Generally speaking, a pressure sensing device may include a body configured to distribute a load applied between first and second parts positioned one against the other, and at least one pressure sensor carried by the body. The at least one pressure sensor may include a support body, and an integrated circuit (IC) die mounted with the support body and defining a cavity therebetween. The IC die may include pressure sensing circuitry responsive to bending associated with the cavity, and an IC interface coupled to the pressure sensing circuitry.

In some embodiments, the two parts may be joined by a threaded fastener, and the at least one pressure sensor is carried by a ring-shaped body. In other embodiments, the two parts may be at least partially overlapped.

The IC interface may include a transceiver circuit, and electrically conductive antenna traces coupled thereto. The at least one pressure sensor may comprise at least one substrate adjacent the IC die and comprising additional electrically conductive antenna traces coupled to the transceiver circuit. The pressure sensing device may further include an arm extension extending outwardly from the body, and the electrically conductive antenna traces may be carried by the arm extension.

Additionally, the additional electrically conductive antenna traces may surround the IC die. The at least one substrate may be canted with respect to the IC die. The at least one pressure sensor may comprise a bonding layer between the IC die and the support body. For example, the support body may comprise at least one of a ceramic material, a glass material, and a silicon material.

In some embodiments, the body may have at least one slot therein, and the at least one pressure sensor may be in the at least one slot. The pressure sensing device may comprise encapsulation material in the at least one slot and surrounding the at least one pressure sensor. The body may comprise encapsulation material.

Another embodiment is also directed to a pressure sensing device. The pressure sensing device may include a body configured to distribute a load applied between first and second parts positioned one against the other, and at least one pressure sensor carried by the body. The at least one pressure sensor may include an IC die mounted with the body and defining a cavity with adjacent portions of the body. The IC die may include pressure sensing circuitry responsive to bending associated with the cavity, and an IC interface coupled to the pressure sensing circuitry. More specifically, the at least one pressure sensor may comprise at least one spacer layer adjacent the IC die.

Another aspect is directed to a method of making a pressure sensing device. The method may include forming a body to distribute a load applied between first and second parts positioned one against the other, and coupling at least one pressure sensor carried by the body. The at least one pressure sensor may include a support body, and an IC die mounted with the support body and defining a cavity therebetween. The IC die may include pressure sensing circuitry responsive to bending associated with the cavity, and an IC interface coupled to the pressure sensing circuitry.

Yet another aspect is directed to a method of making another embodiment of the pressure sensing device. The method may include forming a body configured to distribute a load applied between first and second parts positioned one against the other, and coupling at least one pressure sensor carried by the body. The at least one sensor may include an IC die mounted with the body and defining a cavity with adjacent portions of the body. The IC die may include pressure sensing circuitry responsive to bending associated with the cavity, and an IC interface coupled to the pressure sensing circuitry.

BRIEF DESCRIPTION OF THE DRAWINGS

FIGS. 4A-4D are schematic diagrams of a cross-section view of another embodiment of the pressure sensing device during manufacture.

FIGS. 10-14 are schematic diagrams of a side elevation plan view of other embodiments of the pressure sensing device.

FIG. 15A is a schematic diagram of a top plan view of another embodiment of the pressure sensing device.

FIG. 15B is a schematic diagram of a cross-section view of the pressure sensing device of FIG. 15A along line 15B-15B.

FIGS. 19 and 20 are schematic diagrams of a cross-section view of other embodiments of the pressure sensing device.

FIG. 27A is a schematic diagram of a top plan view of another embodiment of the pressure sensing device.

FIG. 27B is a schematic diagram of a cross-section view of the pressure sensing device of FIG. 27A along line 27B-27B.

FIG. 27C is a schematic diagram of a side elevation view of the pressure sensing device of FIG. 27A.

FIG. 28A is a schematic diagram of a top plan view of another embodiment of the pressure sensing device.

FIG. 28S is a schematic diagram of a cross-section view of the pressure sensing device of FIG. 28A along line 28B-28B.

FIG. 28C is a schematic diagram of a side elevation view of the pressure sensing device of FIG. 28A.

FIG. 29A is a schematic diagram of a top plan view of another embodiment of the pressure sensing device.

FIG. 29B is a schematic diagram of a cross-section view of the pressure sensing device of FIG. 29A along line 29B-29B.

FIG. 29C is a schematic diagram of a side elevation view of the pressure sensing device of FIG. 29A.

FIG. 30A is a schematic diagram of a top plan view of another embodiment of the pressure sensing device.

FIG. 30B is a schematic diagram of a cross-section view of the pressure sensing device of FIG. 30A along line 30B-30B.

FIGS. 32A and 32B are schematic diagrams of a top plan view of another embodiment of the pressure sensing device.

FIG. 32C is a schematic diagram of a cross-section view of the pressure sensing devices of FIGS. 32A and 32B along line 32C-32C.

DETAILED DESCRIPTION

Figure 1:
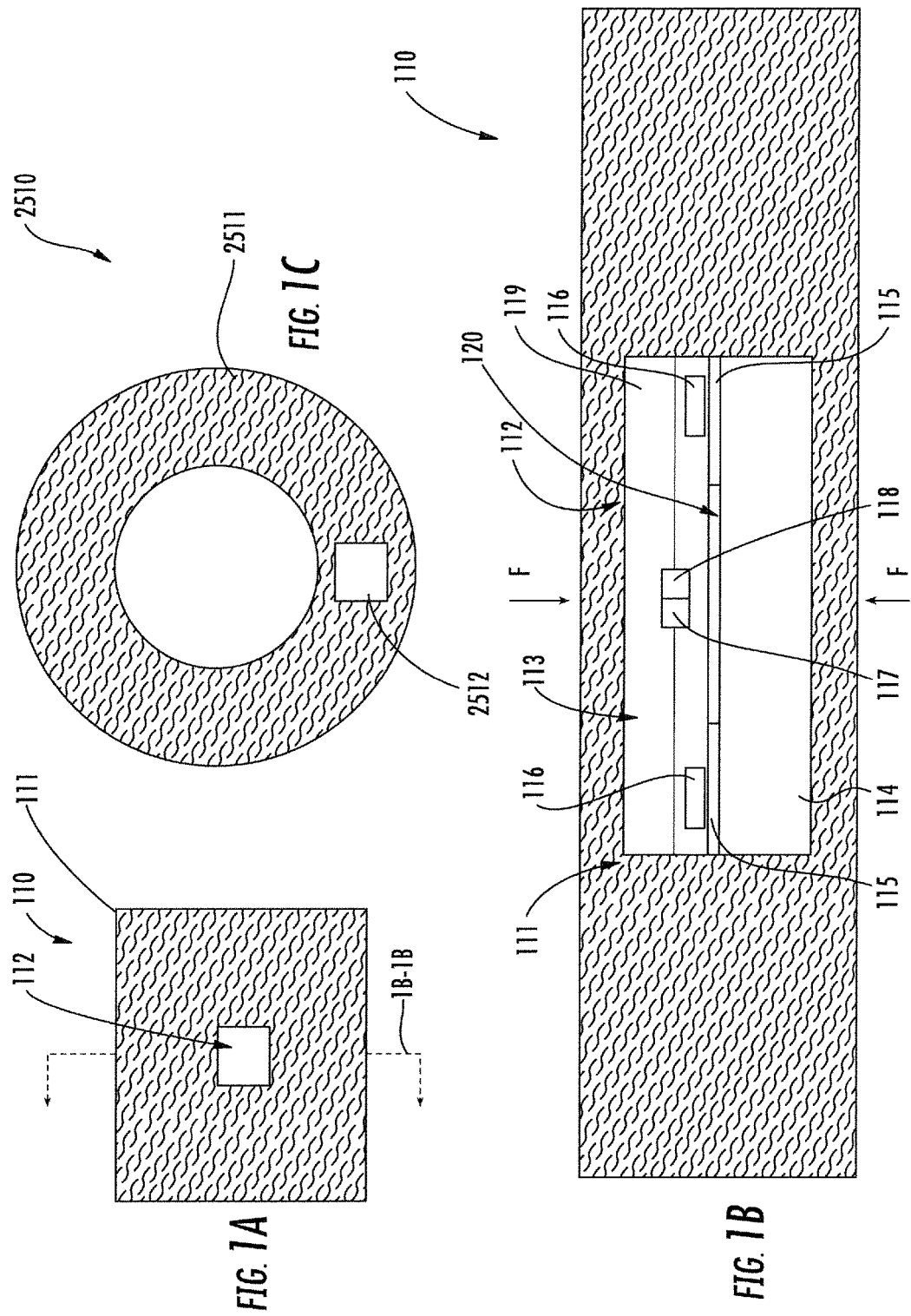
FIG. 1A is a schematic diagram of a top plan view of a pressure sensing device, according to the present disclosure.
FIG. 1B is a schematic diagram of a cross-section view of the pressure sensing device of FIG. 1A along line 1B-1B.
FIG. 1C is a schematic diagram of a top plan view of a pressure sensing device with a ring-shaped body, according to the present disclosure.
Figure 2:
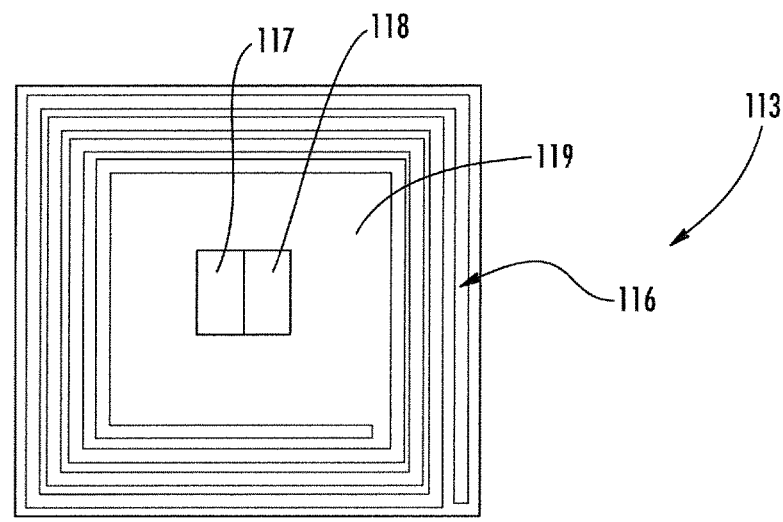
FIG. 2 is a schematic diagram of a top plan view of an IC die from the pressure sensing device of FIG. 1A.
Figure 3:
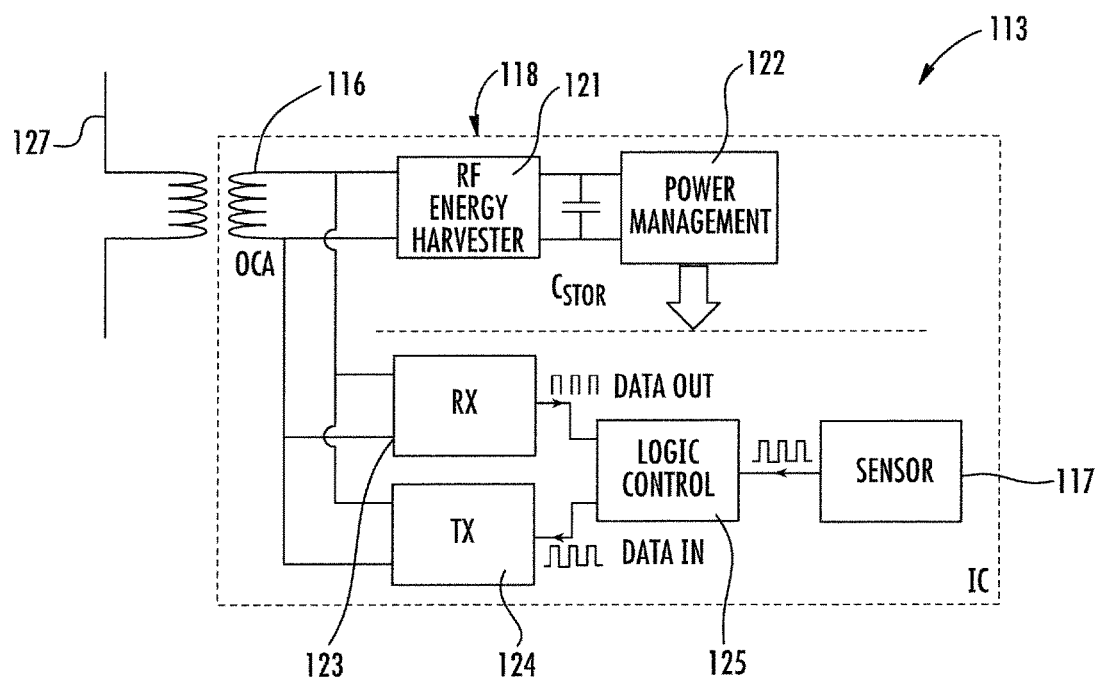
FIG. 3 is a schematic diagram of an embodiment of the IC die from the pressure sensing device of FIG. 1A.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout. Like numbers refer to like elements throughout, and base 100 reference numerals are used to indicate similar elements in alternative embodiments.

Referring to FIGS. 1A-3, a pressure sensing device 110 according to the present invention is now described. The pressure sensing device 110 illustratively includes a body 111 configured to distribute a load applied between first and second parts positioned one against the other (e.g. a threaded fastener, two aligned plates), and a pressure sensor 112 carried by the body. The pressure sensor 112 illustratively includes a support body 114, and an IC die 113 mounted with the support body and defining a cavity 120 therebetween.

In some embodiments, the body 111 may, for example, comprise a ring-shaped body 2511 (FIG. 1C) configured to distribute a load of a threaded fastener, achieving a washer pressure sensing device 2510 (FIG. 1C). The body 111 may have any kind of shape considering that the body 111 can be comprised between two parts that are at least partially overlapped applying a compressive stress on the body (as illustrated in the pressure sensing device 1010b in FIG. 13).

The IC die 113 illustratively includes a substrate 119 (e.g. silicon, gallium arsenide), pressure sensing circuitry 117 (e.g. piezoresistive or piezoelectric pressure/stress detection circuitry) carried by the substrate and responsive to bending associated with the cavity 120, and an IC interface 118 (e.g. external reader wired or wireless interface) carried by the substrate and coupled to the pressure sensing circuitry. Advantageously, the substrate 119 and the support body 114 may provide protection for the pressure sensing circuitry 117, thereby improving reliability.

In an example, the cavity 120 may have a thickness of about 1 micrometer (or more), the substrate 119 may have a thickness of about 100 micrometers, and the support body 114 may have a thickness of some hundreds of micrometers (i.e. 700 micrometers). This may advantageously enable the pressure sensing circuitry 117 to measure high pressure values, such as 100 atmospheres or more.

The pressure sensor 112 illustratively includes a bonding layer 115 (e.g. glass frit bonding layer) between the IC die 113 and the support body 114. For example, the support body 114 may comprise at least one of a ceramic material, a glass material, and a semiconductor material (e.g. silicon).

The IC interface 118, in an example, illustratively includes receiver and transmitter circuits 123, 124 (illustrated as separate circuits, but a combined circuit, commonly called a transceiver/transponder circuit, can be used), and electrically conductive antenna traces 116 carried by the substrate 119 and coupled to the transceiver circuit and configured to receive radio frequency (RF) energy. In the illustrated embodiment, the IC interface 118 also includes logic circuitry 125 coupled to the transceiver circuit 123, 124, an RF harvester circuit 121 coupled to the antenna traces 116, and a power management circuit 122 coupled to the RF harvester circuit. The power management circuit 122 is coupled to all other circuits 123, 124, 125 and 117 to supply power to them. An external antenna 127 is magnetically/electromagnetically coupled to antenna traces 116 to power the IC die 113. In other embodiments (not shown), the RF harvester circuit 121 and the power management circuit 122 may be replaced by as AC/DC converter, such as a rectifier circuit (and eventually a power control circuit like a limiter circuit) that may be typically used in RFID and Smart Card ICs.

Another aspect is directed to a method of making the pressure sensing device 110. The method may include forming a body 111 to distribute a load applied between two opposite surface of the body 111, and coupling at least one pressure sensor 112 carried by the body. The at least one pressure sensor 112 may include a support body 114, and an IC die 113 mounted with the support body and defining a cavity 120 therebetween. The IC die 113 may include pressure sensing circuitry 117 responsive to bending associated with the cavity 120, and an IC interface 118 coupled to the pressure sensing circuitry.

Figures 4A, 4B:
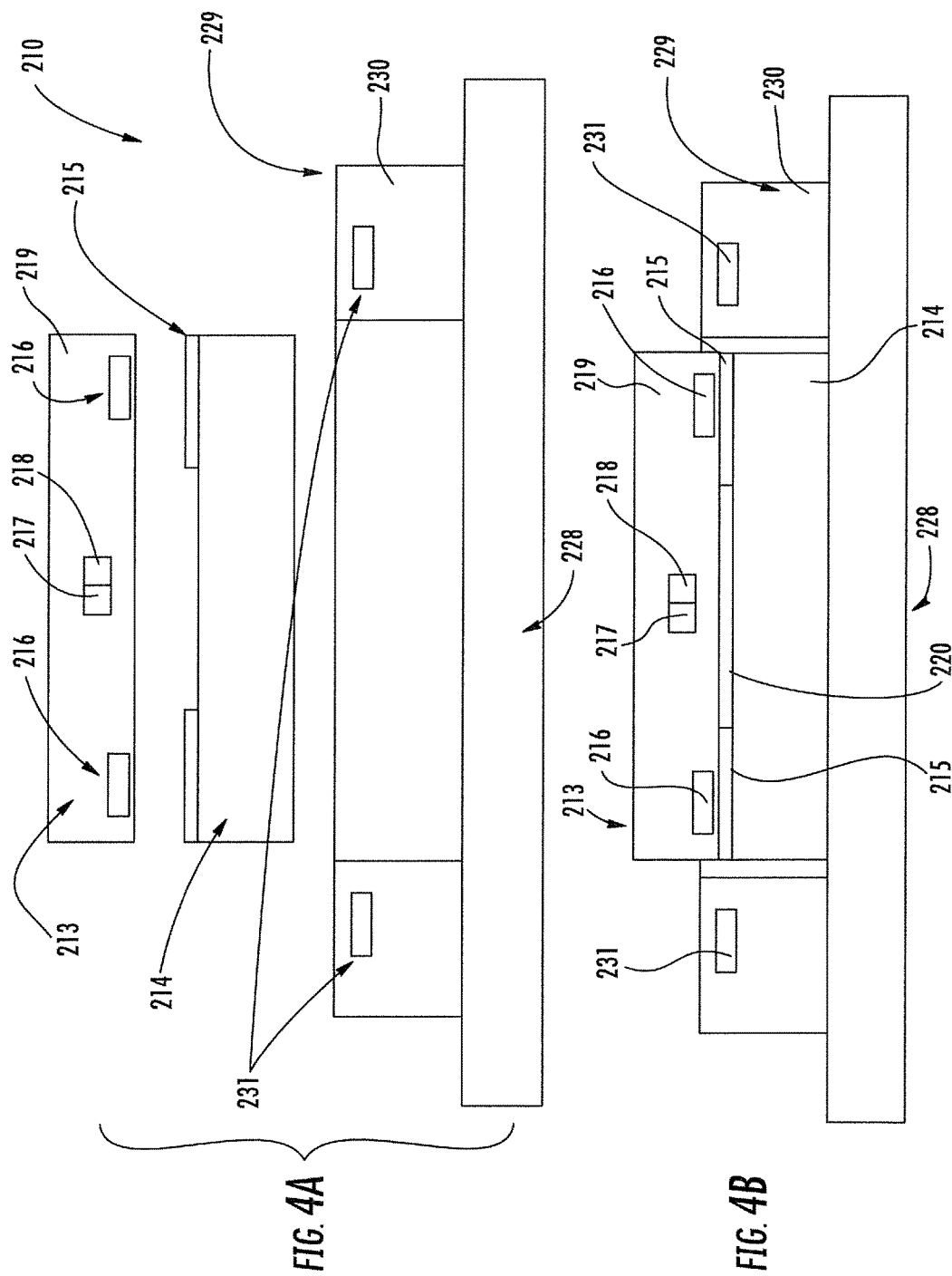

Referring now additionally to FIGS. 4A-4D, another embodiment of the pressure sensing device 210 is now described. In this embodiment of the pressure sensing device 210, those elements already discussed above with respect to FIG. 1 are incremented by 100 and most require no further discussion herein. This embodiment differs from the previous embodiment in that this pressure sensing device 210 illustratively includes the pressure sensor 212 comprising an substrate 229 adjacent the IC die 213 and comprising a substrate 230, and additional electrically conductive antenna traces 231 magnetically/electromagnetically coupled to the electrically conductive antenna traces 216 (FIG. 4D). Advantageously, the substrate 219, the support body 214 and the bonding layer 215 may have high resistivity improving the coupling between electrically conductive antenna traces 231, 216. Additionally, the additional electrically conductive antenna traces 231 may surround the IC die 213. As shown, the method of making this embodiment of the pressure sensing device 210 includes using a carrier layer 228.

The IC die 213 is stacked on the support body 214 and joined by bonding layer 215. In more detail (FIG. 4A), the bonding layer 215 may be an uniform layer on the support body 214 and a portion of the layer can be removed using standard techniques like an etching or a laser beam to create the cavity 220 with the IC die 213. The IC die 213 and the support body 214 are positioned on the carrier layer 228 (FIG. 4B), and then encapsulated (FIG. 4C) using encapsulation material 232.

Once encapsulated, the carrier layer 228 may be released (FIG. 4D). Advantageously, the cavity 220 is created during assembly/packaging process and not during the semiconductor process steps by a recess/cavity in the substrate 219, simplifying production process and reducing manufacturing costs. Then, the cavity dimension can be easily modified, avoiding modification of IC die 213, and changing the full scale range and sensitivity of pressure sensor 212.

Figure 5:
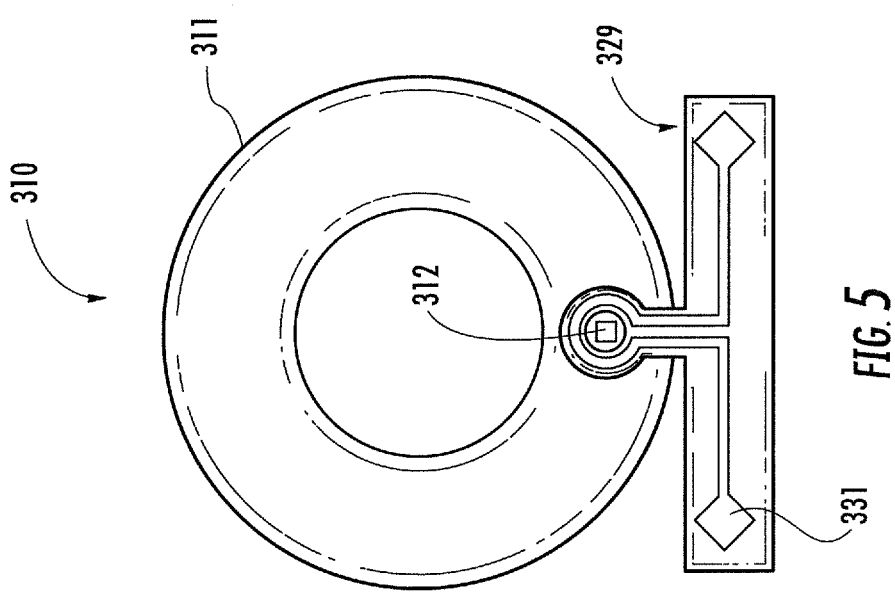

Referring now additionally to FIG. 5, another embodiment of the pressure sensing washer device 310 is now described. In this embodiment of the pressure sensing washer device 310, those elements already discussed above with respect to FIGS. 1 and 4A-4D are incremented by 200 and most require no further discussion herein. This embodiment differs from the previous embodiment in that this pressure sensing washer device 310 illustratively includes the substrate 329 extending beyond the IC die 313 and the ring-shaped body 311.

Advantageously, this embodiment may provide improved RF performance since the additional electrically conductive antenna traces 331 extend beyond the footprint of the threaded fastener, which typically comprises a metallic material. Also, in this embodiment, the additional electrically conductive antenna traces 331 define a Hertz dipole far field antenna, and the ring-shaped body 311 comprises encapsulation material.

Figure 6:
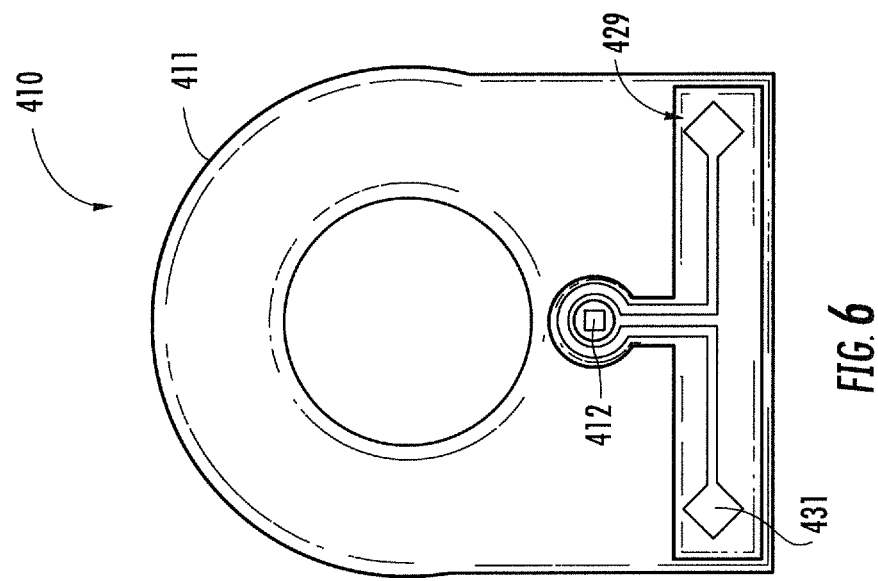
FIGS. 5-9 are schematic diagrams of a top plan view of other embodiments of the pressure sensing device.

Referring now additionally to FIG. 6, another embodiment of the pressure sensing washer device 410 is now described. In this embodiment of the pressure sensing washer device 410, those elements already discussed above with respect to FIG. 5 are incremented by 300 and most require no further discussion herein. This embodiment differs from the previous embodiment in that the encapsulation material also extends beyond the footprint of the threaded fastener and surrounds the substrate 429.

Figure 7:
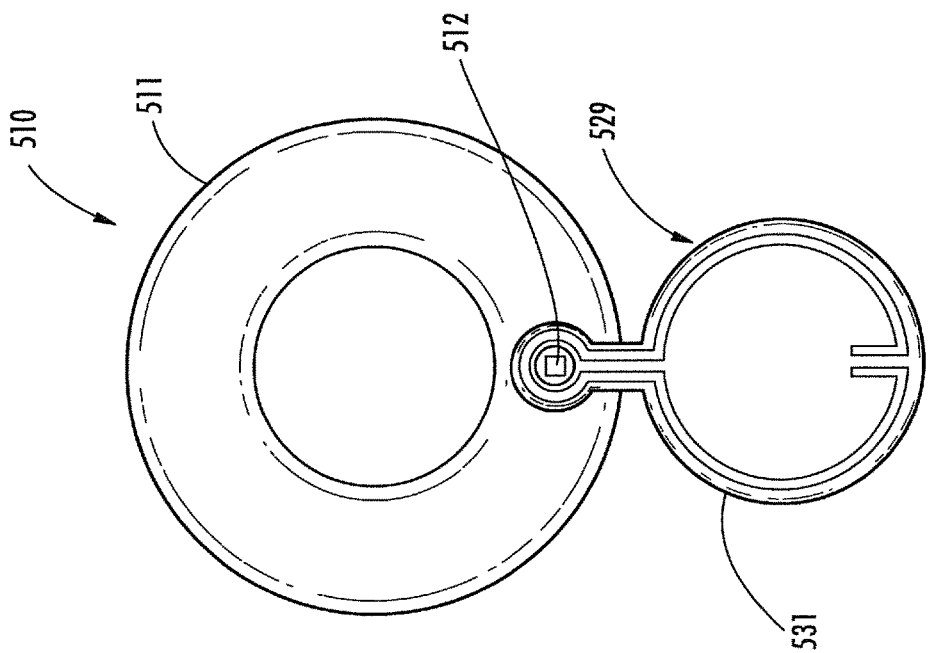

Referring now additionally to FIG. 7, another embodiment of the pressure sensing washer device 510 is now described. In this embodiment of the pressure sensing washer device 510, those elements already discussed above with respect to FIG. 5 are incremented by 400 and most require no further discussion herein. This embodiment differs from the previous embodiment in that the substrate 529 is circle-shaped. In this embodiment, the additional antenna traces 531 define a magnetic dipole and near field antenna with a fringing capacitor. The pressure sensing washer device 510 includes an arm extension extending outwardly from the ring-shaped body 511, and the additional electrically conductive antenna traces 531 are carried by the arm extension.

Figure 8:
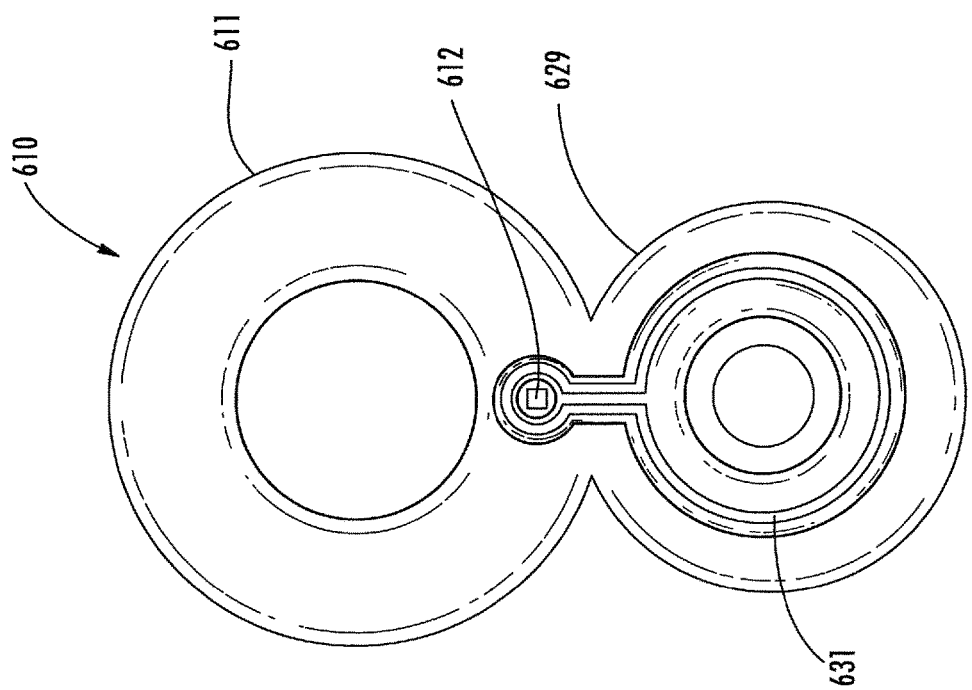

Referring now additionally to FIG. 8, another embodiment of the pressure sensing washer device 610 is now described. In this embodiment of the pressure sensing washer device 610, those elements already discussed above with respect to FIG. 7 are incremented by 500 and most require no further discussion herein. This embodiment differs from the previous embodiment in that the encapsulation material also extends beyond the footprint of the threaded fastener and surrounds the substrate 629.

Figure 9:
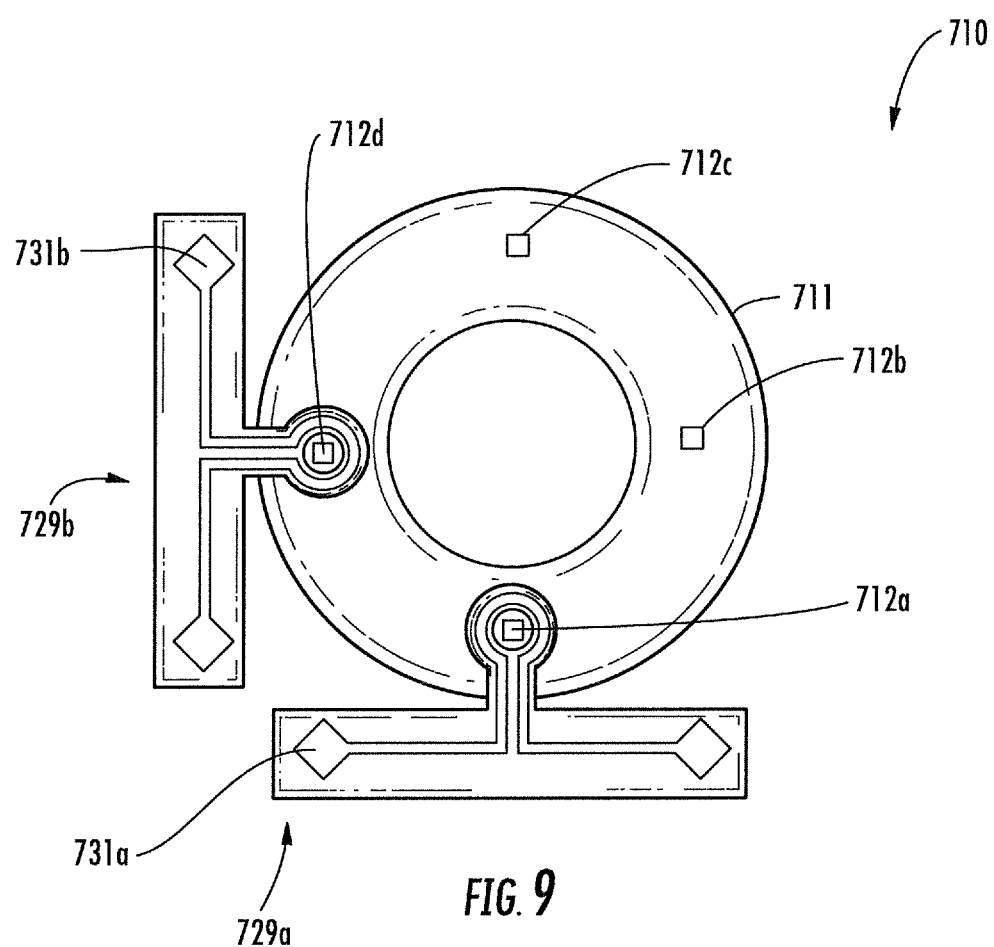

Referring now additionally to FIG. 9, another embodiment of the pressure sensing washer device 710 is now described. In this embodiment of the pressure sensing washer device 710, those elements already discussed above with respect to FIG. 5 are incremented by 600 and most require no further discussion herein. This embodiment differs from the previous embodiment in that the pressure sensing washer device 710 illustratively includes a plurality of pressure sensors 712a-712d spaced apart 90 degrees on the ring-shaped body 711, and a plurality of substrates 729a-729b extending beyond the IC die and the ring-shaped body 711. Advantageously, the plurality of pressure sensors 712a-712d may provide redundancy and improve reliability of the pressure sensing washer device 710. Also, the additional antenna traces 731a-731b may be polarized differently, thereby providing omnidirectional performance. In this embodiment, the ICs 712b, 712b without additional antenna traces may be dummy ICs, which ensure that mechanical stress throughout the ring-shaped body 711 is uniform. In other embodiments, the dummy ICs 712b, 712b can also be functional and include respective substrates and circuits.

Figure 10:
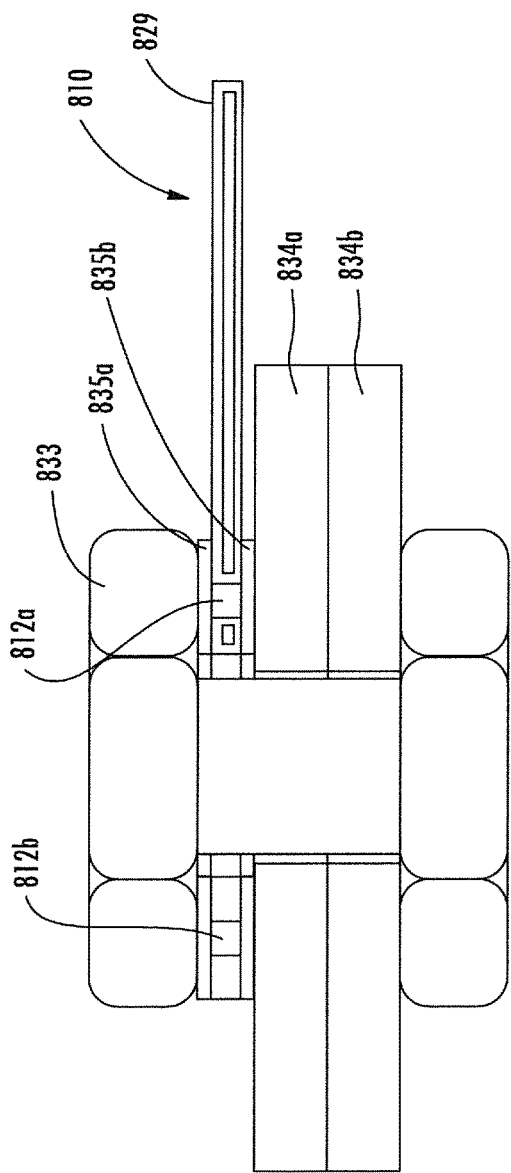
Figure 11:
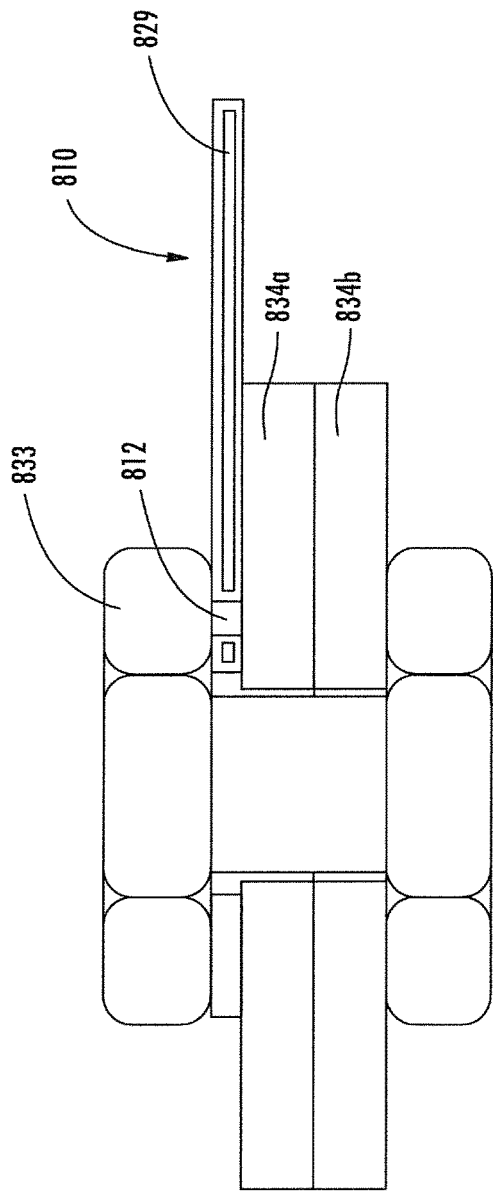

Referring now additionally to FIGS. 10 and 11, another embodiment of the pressure sensing washer device 810 is now described. In this embodiment of the pressure sensing washer device 810, those elements already discussed above with respect to FIG. 1 are incremented by 700 and most require no further discussion herein. Here, the pressure sensing washer device 810 is installed with a fastener 833 (e.g. illustrated bolt) fixing together first and second plates 834a-834b. The pressure sensing washer device 810 is positioned between the head of the bolt 833 and an adjacent plate 834a. In FIG. 10, first and second washer layers 835a-835b (e.g. Teflon) are used to ensure uniform surface stress and prevent damage to the pressure sensing washer device 810 due to irregular surface features of the bolt 833. Second washer layer 835a and/or 835b may improve also the coupling between electrically conductive antenna traces 231, 216 in FIG. 4D increasing their distance with fastener 833 and/or first plates 834a in case it is conductive.

Figure 12:
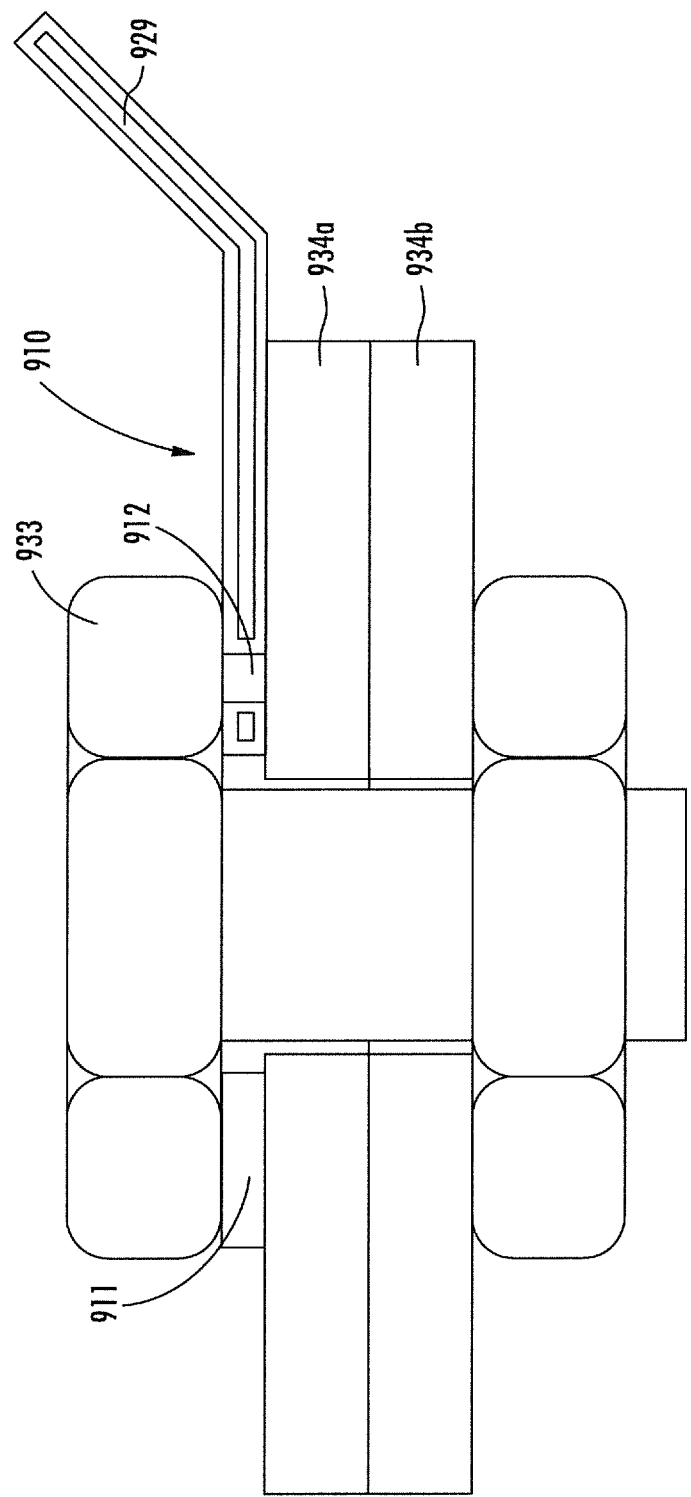

Referring now additionally to FIG. 12, another embodiment of the pressure sensing washer device 910 is now described. In this embodiment of the pressure sensing washer device 910, those elements already discussed above with respect to FIGS. 10 and 11 are incremented by 800 and most require no further discussion herein. Here, the pressure sensing washer device 910 illustratively includes the substrate 929 canted with respect to the pressure sensor 912 and the IC die therein, thereby improving RF performance.

Figure 13:
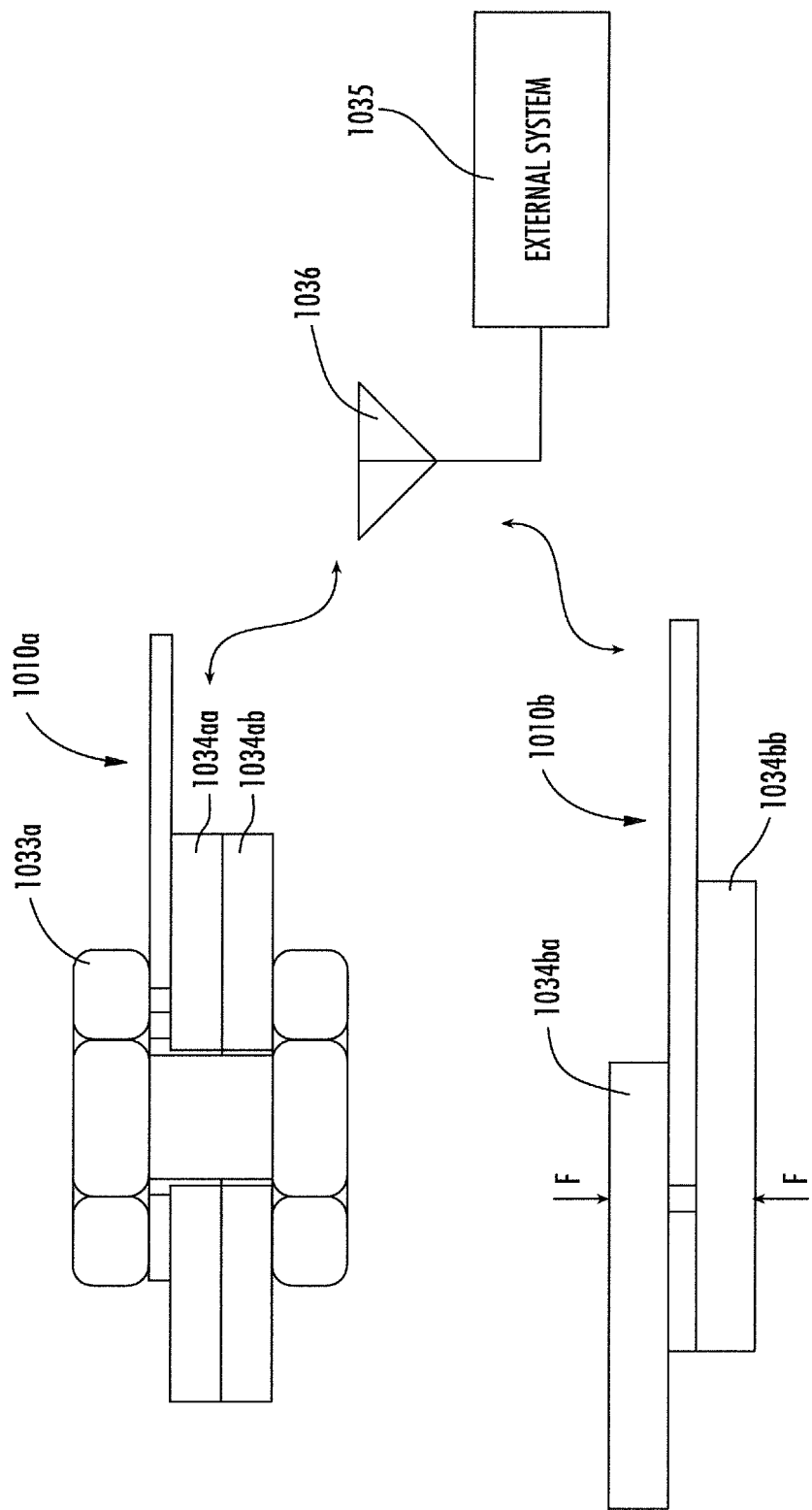

Referring now additionally to FIGS. 13 and 14, another embodiment of the pressure sensing device 1010 is now described. In this embodiment of the pressure sensing device 1010, those elements already discussed above with respect to FIG. 1 are incremented by 900 and most require no further discussion herein. Here, first and second pressure sensing device 1010a-1010b are installed and communicated with via an external system 1035 and associated external antenna 1036. Helpfully, the external system 1035 may communicate with many devices simultaneously, for example, when inspecting a large structure. In FIG. 14, an external RF concentrator 1037, 1038 may be used to enhance RF performance between the external system 1035 and the pressure sensing device 1010.

Referring now additionally to FIGS. 15A and 15B, another embodiment of the pressure sensing washer device 1110 is now described. In this embodiment of the pressure sensing washer device 1110, those elements already discussed above with respect to FIG. 1 are incremented by 1000 and most require no further discussion herein. This embodiment differs from the previous embodiment in that this pressure sensing washer device 1110 illustratively includes the ring-shaped body 1111 having a slot therein, and the pressure sensor 1112 is positioned in the slot. The pressure sensing washer device 1110 illustratively includes encapsulation material 1132 in the slot and surrounding the pressure sensor 1112. Here, the ring-shaped body 1111 may comprise a metallic material, such as steel, nickel, or tungsten or a combination thereof.

Figure 16:
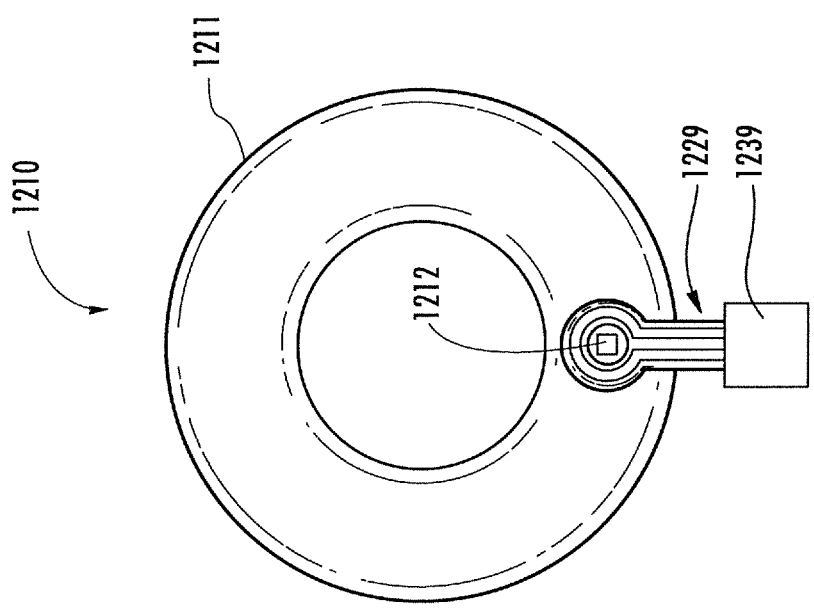
Figure 18:
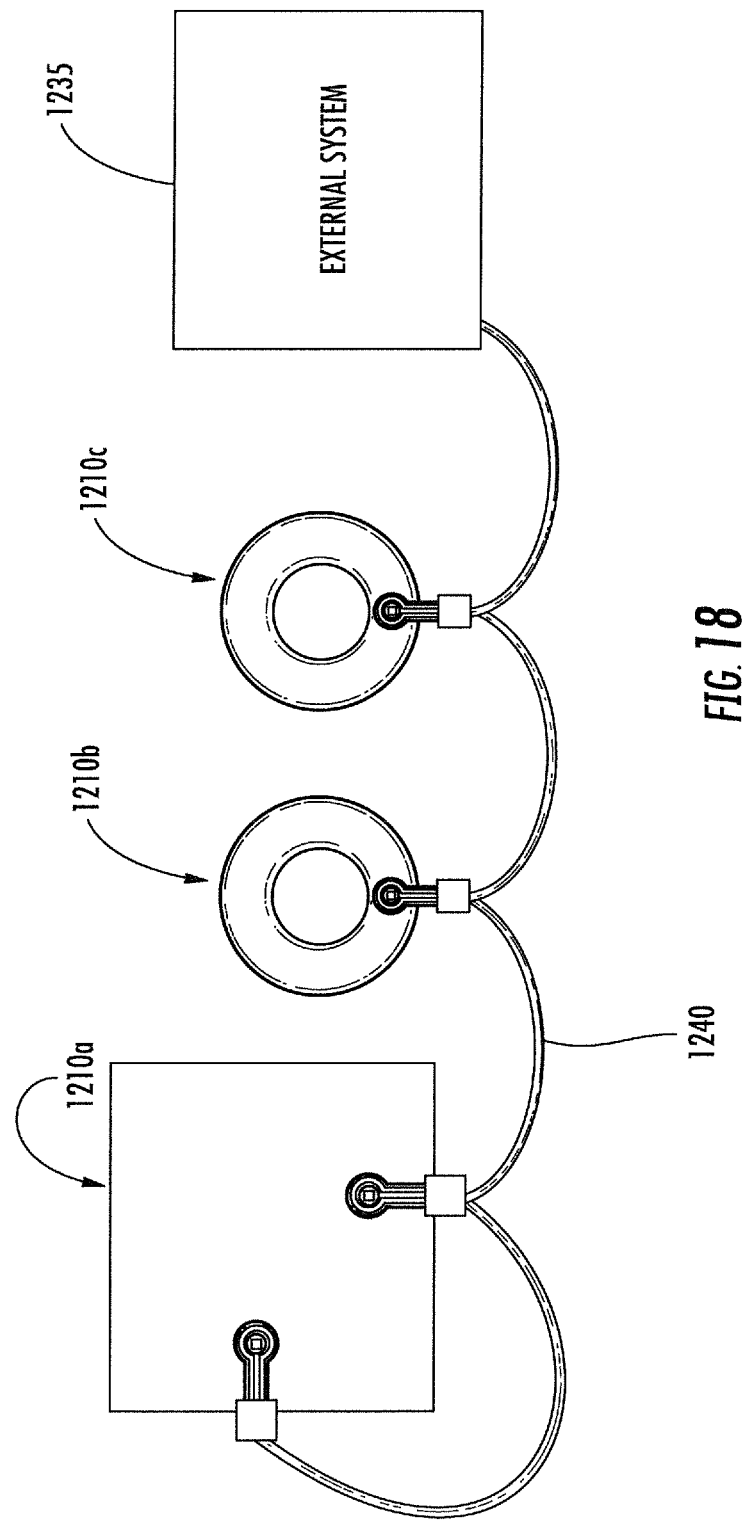

Referring now additionally to FIGS. 16 and 18, another embodiment of the pressure sensing device 1210 is now described. In this embodiment of the pressure sensing device 1210, those elements already discussed above with respect to FIG. 1 are incremented by 1100 and most require no further discussion herein. This embodiment differs from the previous embodiment in that this pressure sensing device 1210 illustratively includes an RF connector 1239 coupled to the substrate 1229, which replaces the RF concentrator of FIG. 14.

In FIG. 18, a wired embodiment is shown. Here, three pressure sensing devices 1210a-1210c are coupled to the external system 1235 via a wire 1240 (e.g. coaxial cable) coupled to each RF connector 1239.

Figure 17:
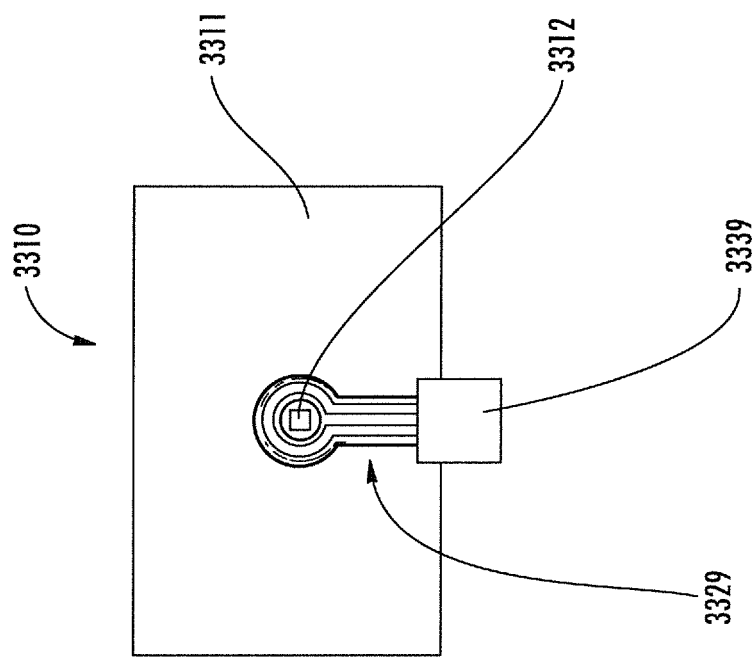
FIGS. 16-18 are schematic diagrams of a top plan view of other embodiments of the pressure sensing device.

Referring now additionally to FIG. 17, another embodiment of the pressure sensing device 3310 is now described. In this embodiment of the pressure sensing device 3310, those elements already discussed above with respect to FIG. 16 are incremented by 3200 and most require no further discussion herein. This embodiment differs from the previous embodiment in that this pressure sensing device 3310 illustratively includes encapsulation material surrounding the RF connector 3339, and the body 3311 is rectangle-shaped.

Figure 22:
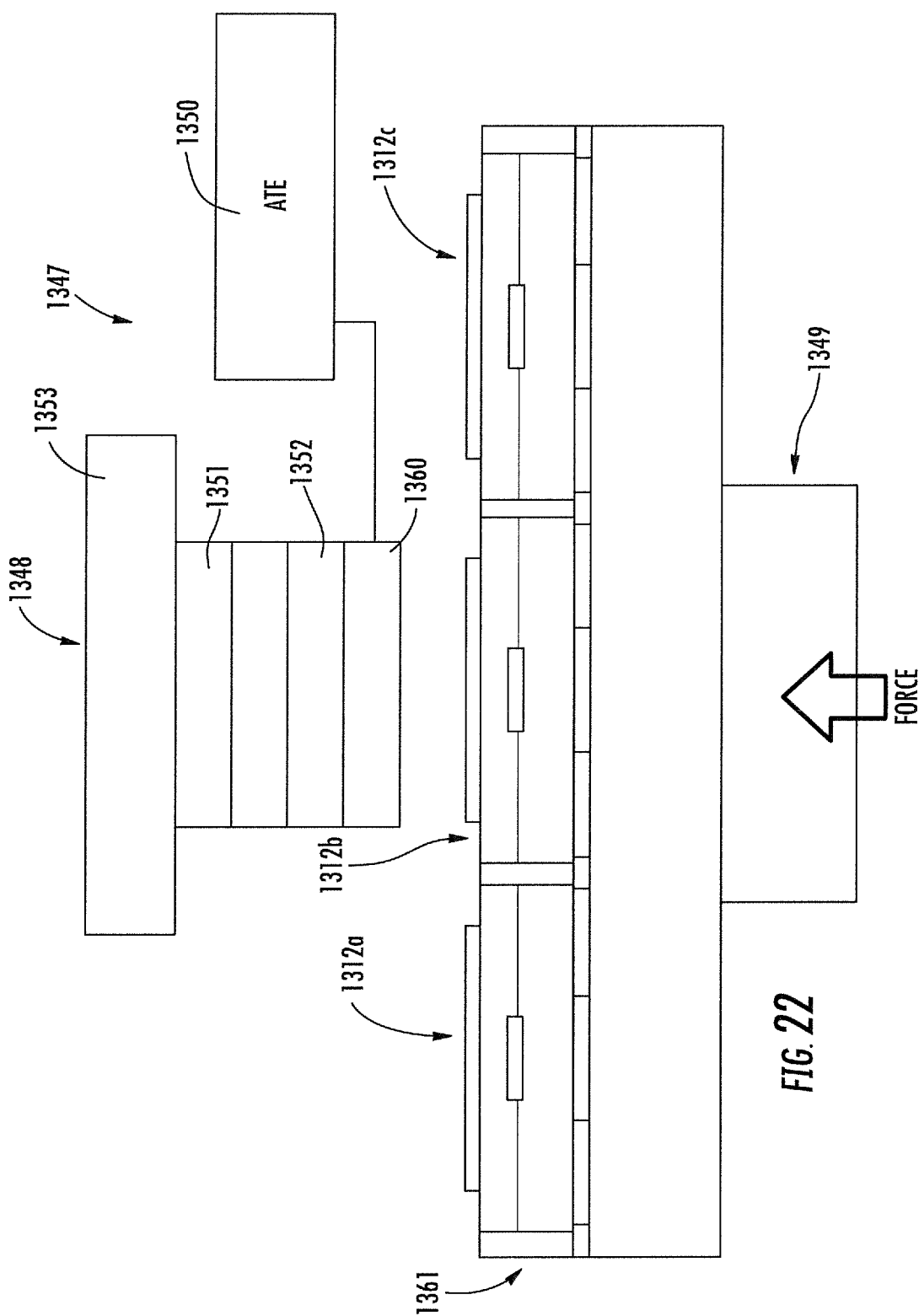
FIGS. 22-23 are schematic diagrams of a side elevation plan view of the pressure sensing device of FIG. 19 during testing.

Referring now additionally to FIGS. 19 and 22, another embodiment of the pressure sensing device 1310 is now described. In this embodiment of the pressure sensing device 1310, those elements already discussed above with respect to FIG. 1 are incremented by 1200 and most require no further discussion herein. This embodiment differs from the previous embodiment in that this pressure sensing device 1310 illustratively includes a body 1711 configured to distribute a load of an external compressive stress, and a pressure sensor 1312 carried by the body. The pressure sensor 1312 illustratively includes an IC die 1313 mounted with the body and defining a cavity 1320 with adjacent portions of the body. The IC die 1313 illustratively includes pressure sensing circuitry 1317 responsive to bending associated with the cavity, and an IC interface 1318 coupled to the pressure sensing circuitry. More specifically, the pressure sensor 1312 illustratively includes a first spacer layer 1315 adjacent the IC die 1313 and also defining the cavity, and a second spacer layer 1341 adjacent the IC die. The first and second spacer layers 1315, 1341 may comprise a metallic material, such as nickel, chrome, gold, aluminum, copper, gold-tin.

Yet another aspect is directed to a method of making the pressure sensing device 1310. The method may include forming a body configured to distribute a load of an external compressive stress, and coupling at least one pressure sensor 1312 carried by the body. The at least one sensor 1312 may include an IC die 1313 mounted with the support body and defining a cavity 1320 with adjacent portions of the body. The IC die 1313 may include pressure sensing circuitry 1317 responsive to bending associated with the cavity, and an IC interface 1318 coupled to the pressure sensing circuitry.

In FIG. 22, a wafer 1361 comprising a plurality of pressure sensing devices 1312a-1312c is tested with testing system 1347. The testing system 1347 illustratively includes an arm 1348 comprising a rigid substrate 1353, a load cell 1351 coupled to the rigid substrate, a ball joint 1352 coupled to the load cell, and a contact plate 1360 for applying set pressure to each pressure sensing device 1312a-1312c. The testing system 1347 illustratively includes a prober chuck 1349, and an Automatic Testing Equipment (ATE) 1350 coupled to the arm 1348 and the prober chuck. The arm 1348 presses each pressure sensing device 1312a-1312c and also provides power (via the contact plate 1360) and signals to the device.

Referring now additionally to FIG. 20, another embodiment of the pressure sensing device 1410 is now described. In this embodiment of the pressure sensing device 1410, those elements already discussed above with respect to FIG. 19 are incremented by 1300 and most require no further discussion herein. This embodiment differs from the previous embodiment in that this pressure sensing device 1410 illustratively includes the second spacer layer 1441 extending across the entirety of the substrate 1419.

In FIGS. 4A-4D the cavity 220 is created starting from the support body 114 instead of in FIGS. 19-20 the cavity 1320, 1420 is created starting from the IC die 1313 (on the bottom surface), 1314 (on the top surface).

Figure 21:
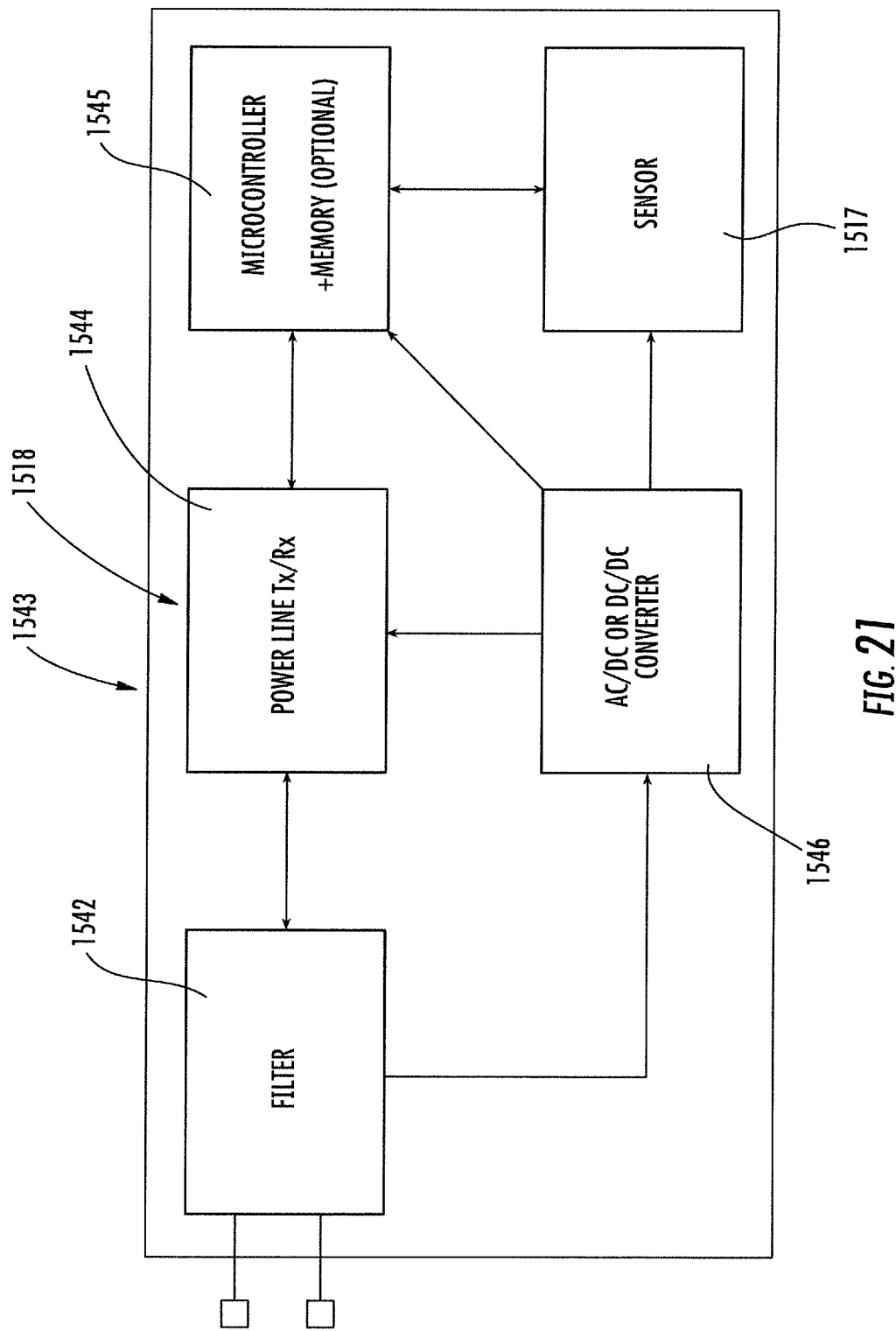
FIG. 21 is a schematic diagram of an embodiment of the IC die from the pressure sensing device.

Referring now additionally to FIG. 21, another embodiment of the pressure sensing device is now described. In this embodiment of the pressure sensing device, IC die 1513 illustratively includes a filter circuit 1542, a power line transceiver/transponder circuit 1544 coupled to the filter circuit, a controller circuit 1545 (that optionally may include memory) coupled to the transceiver circuit, a sensor 1517 coupled to the controller, and an AC/DC or a DC/DC converter 1546 (can be omitted in other embodiments) coupled to the filter, transceiver, and controller circuits.

Figure 23:
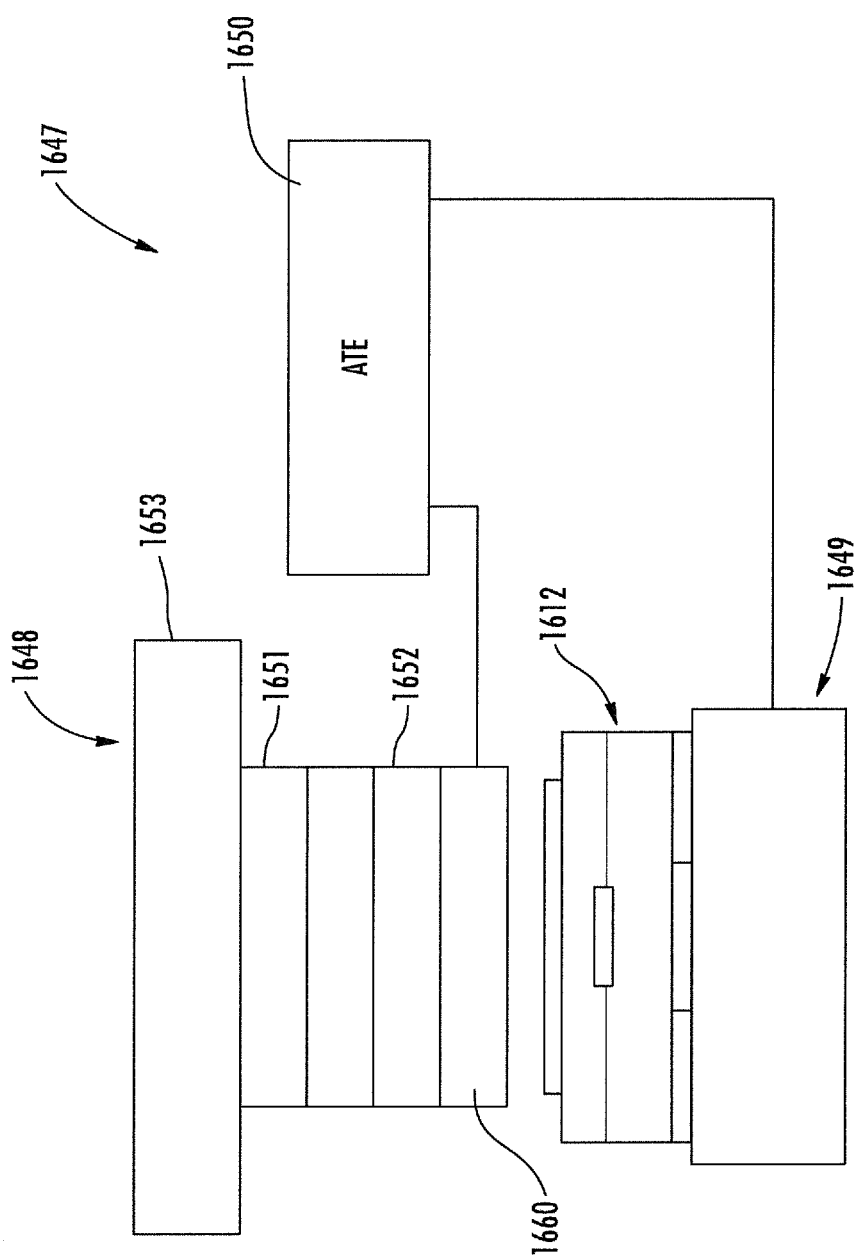

Referring now additionally to FIG. 23, another embodiment of the testing system 1647 is now described. In this embodiment of the testing system 1647, those elements already discussed above with respect to FIGS. 19 and 22 are incremented by 1500 and most require no further discussion herein. This embodiment differs from the previous embodiment in that this testing system 1647 tests a single pressure sensor 1612 at a time.

Figure 24A:
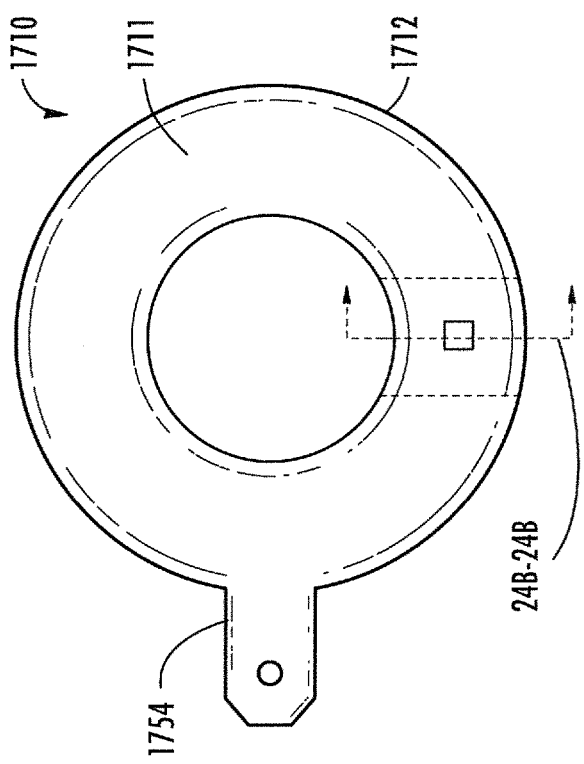
FIG. 24A is a schematic diagram of a top plan view of another embodiment of the pressure sensing device.
Figure 24B:
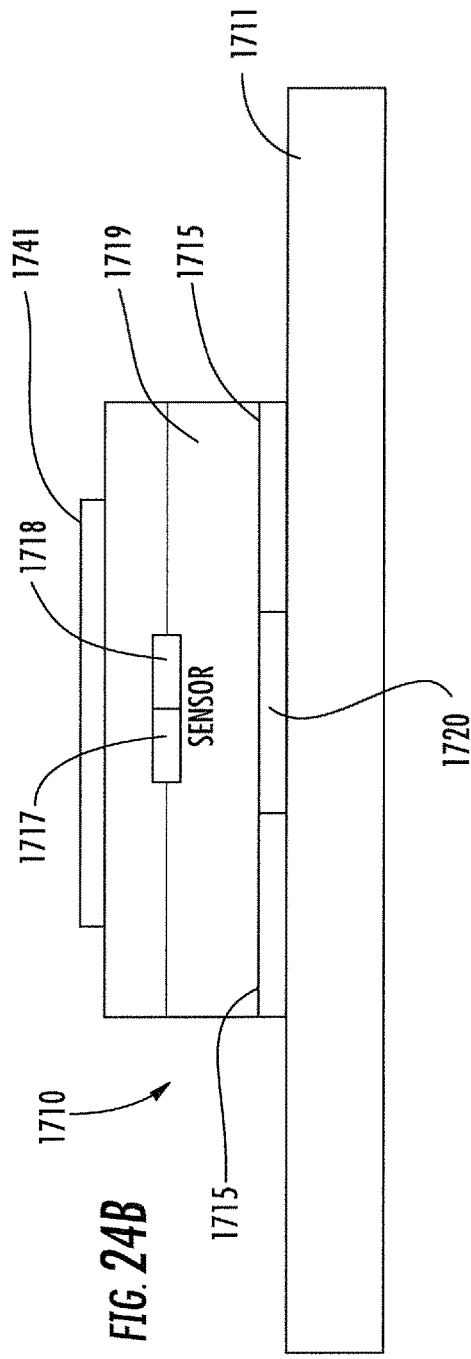
FIG. 24B is a schematic diagram of a cross-section view of the pressure sensing device of FIG. 24A along line 24B-24B.
Figure 25:
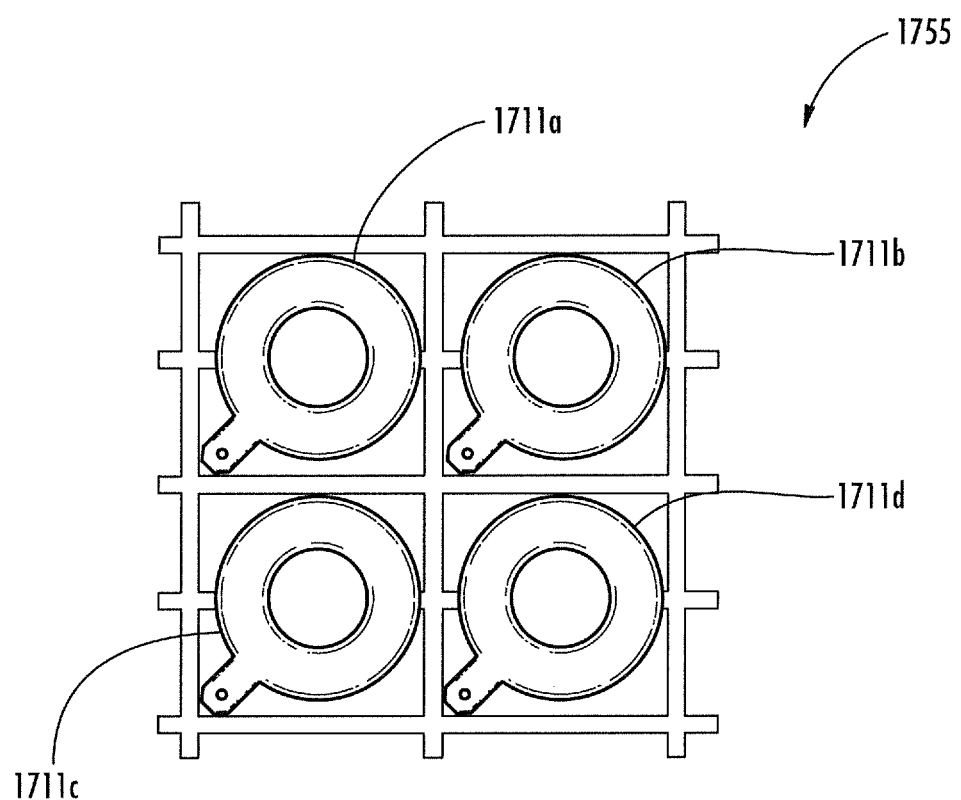
FIG. 25 is a top plan view of the pressure sensing device of FIG. 24A during manufacture.

Referring now additionally to FIGS. 24A, 24B, and 25, another embodiment of the pressure sensing washer device 1710 is now described. In this embodiment of the pressure sensing washer device 1710, those elements already discussed above with respect to FIG. 19 are incremented by 1600 and most require no further discussion herein. This embodiment differs from the previous embodiment in that this pressure sensing washer device 1710 is mounted onto the ring-shaped body 1711, which includes a connector 1754 extending outwardly therefrom. Here, the ring-shaped body 1711 comprises a metallic material, and the first spacer layer 1715 is soldered/welded onto the ring-shaped body to define the cavity 1720. As shown in FIG. 25, the ring-shaped body 1711 can be readily manufactured in large numbers by forming a lead frame 1755.

Figure 26A:
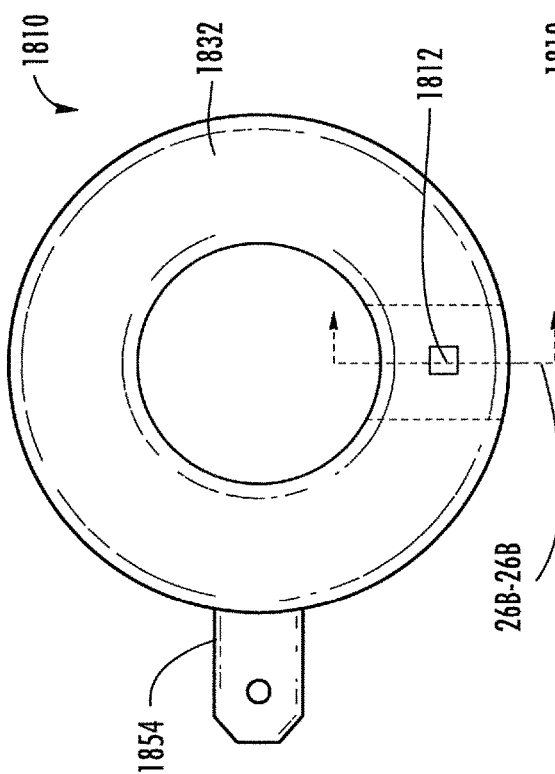
FIG. 26A is a schematic diagram of a top plan view of another embodiment of the pressure sensing device.
Figure 26B:
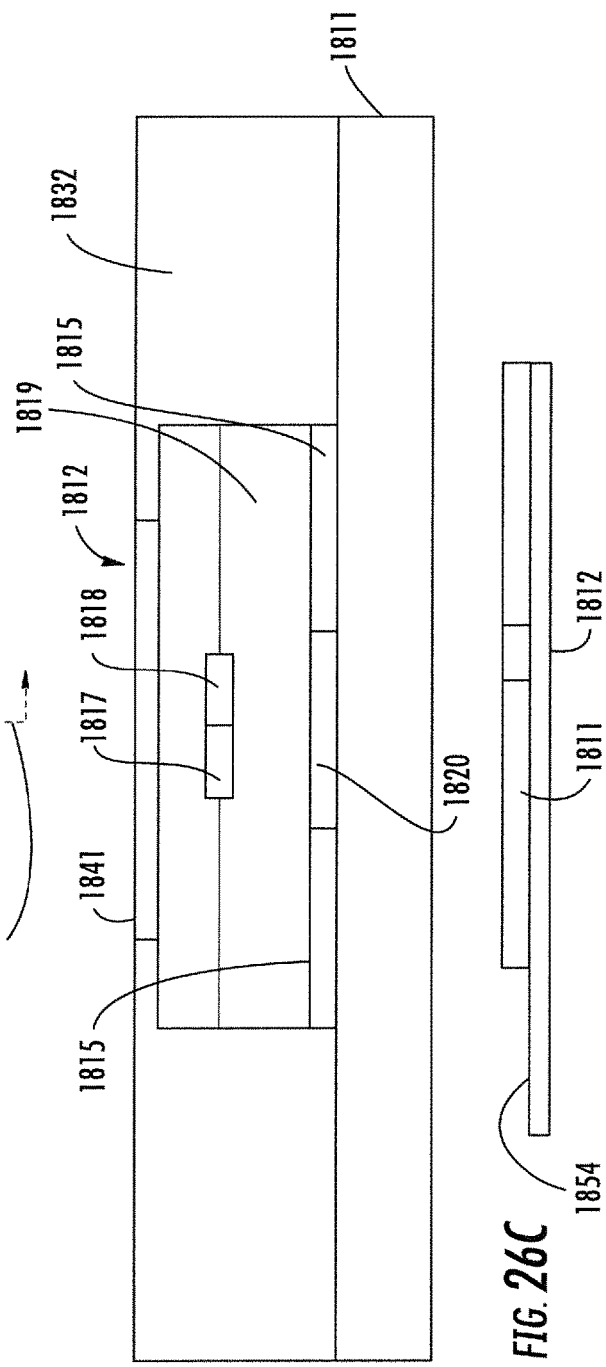
FIG. 26B is a schematic diagram of a cross-section view of the pressure sensing device of FIG. 26A along line 26B-26B.
Figure 26C:
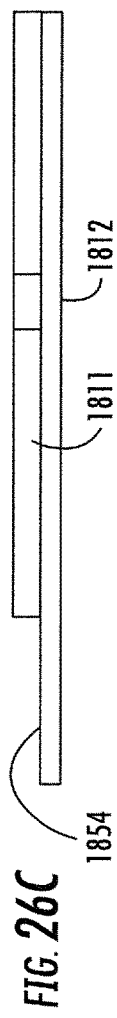
FIG. 26C is a schematic diagram of a side elevation view of the pressure sensing device of FIG. 26A.

Referring now additionally to FIGS. 26A, 26B, and 26C, another embodiment of the pressure sensing washer device 1810 is now described. In this embodiment of the pressure sensing washer device 1810, those elements already discussed above with respect to FIG. 19 are incremented by 1700 and most require no further discussion herein. This embodiment differs from the previous embodiment in that this pressure sensing washer device 1810 illustratively includes encapsulating material 1832 surrounding the pressure sensor 1812 and covering the ring-shaped body 1811.

Referring now additionally to FIGS. 27A, 27B, and 27C, another embodiment of the pressure sensing washer device 1910 is now described. In this embodiment of the pressure sensing washer device 1910, those elements already discussed above with respect to FIG. 19 are incremented by 1800 and most require no further discussion herein. This embodiment differs from the previous embodiment in that this pressure sensing washer device 1910 illustratively includes first and second ring-shaped bodies 1911*a*-1911*b* aligned together, and encapsulating material 1932 between the ring-shaped bodies and surrounding the pressure sensor 1912.

Figure 31:
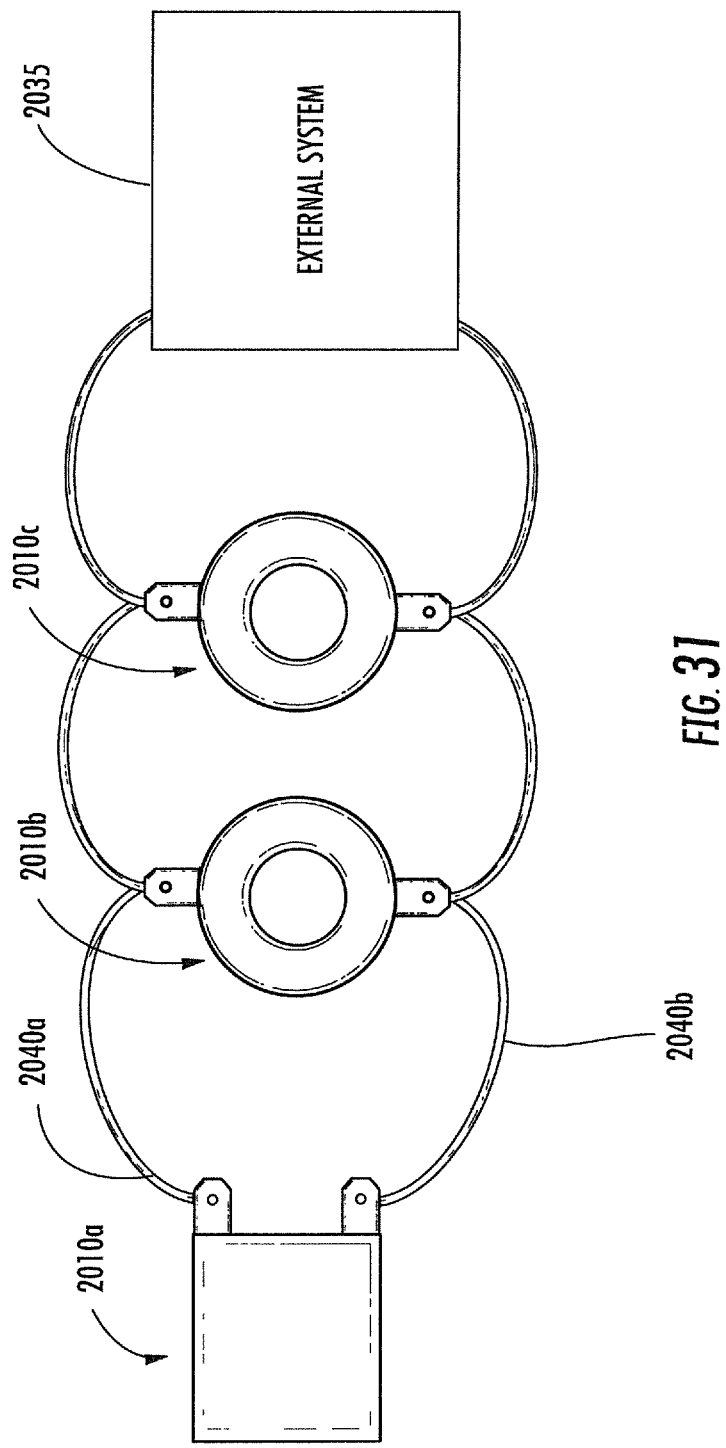
FIG. 31 is a schematic diagram of a top plan view of another embodiment of the pressure sensing device.

Referring now additionally to FIGS. 28A, 28B, 28C, and 31, another embodiment of the pressure sensing washer device 2010 is now described. In this embodiment of the pressure sensing washer device 2010, those elements already discussed above with respect to FIGS. 19 and 27A-27C are incremented by 1900 and most require no further discussion herein. This embodiment differs from the previous embodiment in that this pressure sensing washer device 2010 illustratively includes first and second insulator layers 2056*a*-2056*b* covering external surfaces of the first and second ring-shaped bodies 2011*b*-2011*c*. In FIG. 31, a wired embodiment is shown. Here, three pressure sensing devices 2010*a*-2010*c* are coupled to the external system 2035 via wires 2040*a*-2040*b* (e.g. twisted pair cable).

Referring now additionally to FIGS. 29A, 29B, and 29C, another embodiment of the pressure sensing washer device 2110 is now described. In this embodiment of the pressure sensing washer device 2110, those elements already discussed above with respect to FIGS. 19 and 28A-28C are incremented by 2000 and most require no further discussion herein. This embodiment differs from the previous embodiment in that this pressure sensing washer device 2110 illustratively includes a mechanical guide 2157 extending between the first and second ring-shaped bodies 2111*a*-2111*b*, and the second insulator layer 2156*b* includes a portion 2158 that to meet the mechanical guide.

Referring now additionally to FIGS. 30A and 30B, another embodiment of the pressure sensing washer device 2210 is now described. In this embodiment of the pressure sensing washer device 2210, those elements already discussed above with respect to FIGS. 19 and 28A-28C are incremented by 2100 and most require no further discussion herein. This embodiment differs from the previous embodiment in that this pressure sensing washer device 2210 illustratively includes the ring-shaped body 2211 defining a ring-shaped recess therein, and the pressure sensor 2212 is positioned within the ring-shaped recess. The pressure sensing washer device 2210 illustratively includes a ring-shaped layer 2262 over the pressure sensor 2212 and aligned with the ring-shaped recess.

Referring now additionally to FIGS. 32A, 32B, and 32C, another embodiment of the pressure sensing device 2310 is now described. In this embodiment of the pressure sensing device 2310, those elements already discussed above with respect to FIGS. 19 and 28A-28C are incremented by 2200 and most require no further discussion herein. This embodiment differs from the previous embodiment in that this pressure sensing device 2310 illustratively includes an IC die 2313 that is coupled by wire bonding 2380 to the substrate 2329, that surround the IC die 2313 and is coupled with a connector 2339.

In FIG. 32A the pressure sensing device 2310 may have some openings 2482*a*-2482*d*, for example, in the periphery, to join it with at least one of the two parts that apply the compressive stress. A body 2411, for example, with T-shaped cross-section in FIG. 32B, is mechanically coupled with the IC die 2313 to apply the compressive stress.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. A pressure sensing device for measuring pressure between two members positioned against each other, the pressure sensing device comprising:
   a main body configured to distribute a load between the two members, the main body being arranged between the two members, the main body having an interior and an exterior; and
   a pressure sensor carried in the interior of the main body, the pressure sensor comprising:
      a support body, and
      an integrated circuit (IC) die having an unsupported middle and two supported sides on either side of the unsupported middle, the two supported sides being mounted on the support body, and the IC die comprising a pressure sensing circuitry and an IC interface coupled to the pressure sensing circuitry;
   wherein the IC interface comprises a transceiver circuit and an electrically conductive antenna trace coupled to the transceiver circuit;
   wherein the two supported sides and the unsupported middle of the IC die with the support body define a cavity inside the pressure sensor between the IC die and the support body, wherein the pressure sensing circuitry is positioned in the unsupported middle of the IC die, over a portion of the cavity that is one of a center and near the center of the cavity;

wherein the electrically conductive antenna trace is positioned over where a supported side of the IC die is mounted on the support body; and wherein the pressure sensing circuitry is responsive to a bending of the IC die through the unsupported middle over the cavity.

2. The pressure sensing device of claim 1, further comprising a plurality of additional electrically conductive antenna traces so that pressure information can be wirelessly transmitted from the pressure sensor.

3. The pressure sensing device of claim 1, wherein the pressure sensor further comprises a bonding layer between the supported sides of the IC die and the support body, the bonding layer defining both sides of the cavity.

4. The pressure sensing device of claim 3, wherein the bonding layer comprises a glass frit bonding material.

5. The pressure sensing device of claim 1, wherein the support body comprises a ceramic material, a glass material, or a silicon material.

6. The pressure sensing device of claim 1, wherein the main body further comprises a slot within the interior of the main body and encapsulation material; and wherein the pressure sensor is arranged inside the slot, the encapsulation material surrounding the pressure sensor and filling the slot around the pressure sensor.

7. The pressure sensing device of claim 1, further comprising an additional pressure sensor, the additional pressure sensor being carried by the main body adjacent to the pressure sensor.

8. The pressure sensing device of claim 7, further comprising two dummy sensors adjacent to one another and carried by the main body, together with the pressure sensor and the additional pressure sensor;

wherein a spacing between each of the two dummy sensors, the pressure sensor and the additional pressure sensor are equal around a perimeter of the main body, the spacing contributing to a more even distribution of the load around the perimeter of the main body.

9. The pressure sensing device of claim 1, wherein the two members comprise a bolt and a plate, and the main body comprises a washer positioned between the bolt and the plate.

10. The pressure sensing device of claim 1, wherein the main body includes a ring-shaped body, and wherein the pressure sensor is carried in the interior of the ring-shaped body.

11. A pressure sensing device for measuring pressure between two members positioned against each other, the pressure sensing device comprising:

a main body configured to distribute a load between the two members, the main body being arranged between the two members, the main body having an upper surface; and a pressure sensor carried by the main body, the pressure sensor comprising:

a spacer layer on a surface of the main body, the spacer layer including two side sections extending above the upper surface of the main body with a space between the two side sections, the surface of the main body exposed between the two side sections defining a lower periphery of the space; and an integrated circuit (IC) die over the spacer layer, the IC die having an unsupported middle and two supported sides on either side of the unsupported middle, the two supported sides of the IC die being mounted to the two side sections of the spacer layer, the unsupported middle of the IC die defining an upper periphery of the space, the supported sides of the IC die and the two side sections of the spacer layer defining both sides of the space, with the supported sides, the lower periphery and the upper periphery of the space defining an enclosed cavity inside the pressure sensor between the main body and the IC die;

wherein the IC die comprises a pressure sensing circuitry and an IC interface coupled to the pressure sensing circuitry, and the IC interface comprises a transceiver circuit and an electrically conductive antenna trace coupled to the transceiver circuit;

wherein the pressure sensing circuitry is positioned in the unsupported middle of the IC die, over a portion of the enclosed cavity that is one of a center and near the center of the enclosed cavity;

wherein the electrically conductive antenna trace is positioned over a side section of the spacer layer; and wherein the pressure sensing circuitry is responsive to a bending of the IC die through the unsupported middle of the IC die over the enclosed cavity.

12. The pressure sensing device of claim 11, wherein the spacer layer comprises a metallic material.

13. The pressure sensing device of claim 11, wherein the electrically conductive antenna trace comprises a first electrically conductive antenna trace and a second electrically conductive antenna trace;

wherein the two supported sides comprise a first supported side and a second supported side; and wherein the first electrically conductive antenna trace is positioned over the first supported side, and the second electrically conductive antenna trace is positioned over the second supported side.

14. The pressure sensing device of claim 13, wherein the pressure sensor comprises a substrate adjacent to the IC die, the substrate comprising a plurality of additional electrically conductive antenna traces coupled to the transceiver circuit, to the first electrically conductive antenna trace, and to the second electrically conductive antenna trace.

15. The pressure sensing device of claim 14, wherein the plurality of additional electrically conductive antenna traces surround the IC die.

16. The pressure sensing device of claim 14, wherein the substrate is canted with respect to the IC die.

17. The pressure sensing device of claim 13, further comprising:

a plurality of additional electrically conductive antenna traces coupled to the transceiver circuit, to the first electrically conductive antenna trace, and to the second electrically conductive antenna trace; and an arm extension extending outwardly from the main body;

wherein the plurality of additional electrically conductive antenna traces are carried by the arm extension.

18. The pressure sensing device of claim 11, wherein the main body comprises a slot and encapsulation material, the pressure sensor being arranged inside the slot, with the encapsulation material surrounding the pressure sensor and filling the slot around the pressure sensor.

19. A pressure sensing system for measuring pressure comprising:

a first washer configured to distribute a load between a first member and a second member positioned against the first member in a structure, the first washer being arranged between the first member and the second member, the first washer having an interior and an exterior; and a first pressure sensor carried in the interior of the first washer, the first pressure sensor comprising:
- a support body;
- a semiconductor die having an unsupported middle and two supported sides on either side of the unsupported middle, the two supported sides being mounted on the support body;
- wherein the semiconductor die comprises a pressure sensing circuitry and an IC interface coupled to the pressure sensing circuitry, the IC interface comprising a transceiver circuit and an electrically conductive antenna trace coupled to the transceiver circuit;
- wherein the two supported sides and the unsupported middle of the semiconductor die with the support body define a cavity inside the first pressure sensor between the semiconductor die and the support body;
- wherein the pressure sensing circuitry is positioned in the unsupported middle of the semiconductor die, over a portion of the cavity that is one of a center and near the center of the cavity;
- wherein the electrically conductive antenna trace is positioned over where a supported side of the semiconductor die is mounted on the support body; and
- wherein the pressure sensing circuitry is responsive to a bending of the semiconductor die through the unsupported middle over the cavity.

20. The pressure sensing system of claim 19, wherein the first pressure sensor further comprises a substrate adjacent to the IC die, and a plurality of additional electrically conductive antenna traces carried in the substrate, the plurality of additional electrically conductive antenna traces being coupled to the transceiver circuit.

21. The pressure sensing device of claim 20, wherein the plurality of additional electrically conductive antenna traces surround the IC die.

22. The pressure sensing device of claim 20, wherein the substrate is canted with respect to the first pressure sensor.

23. The pressure sensing system of claim 19, wherein the first pressure sensor further comprises an additional electrically conductive antenna trace coupled to the transceiver circuit;
- wherein the pressure sensing system further comprises an arm extension attached to the first washer and extending outwardly from the first washer; and
- wherein the additional electrically conductive antenna trace is carried by the arm extension.

24. The pressure sensing system of claim 19 further comprising:
- a second washer configured to distribute a load between a third member and a fourth member positioned against the third member in a structure, the second washer being arranged between the third member and the fourth member, the second washer having an interior and an exterior; and
- a second pressure sensor carried in the interior of the second washer, the second pressure sensor communicably connected with the first pressure sensor;
- wherein the first member and the third member are different or same members, and the second member and the fourth member are different or same members.

* * * * *